US010505750B2

(12) United States Patent
Jennequin et al.

(10) Patent No.: US 10,505,750 B2
(45) Date of Patent: Dec. 10, 2019

(54) BOX FOR COMMUNICATION AND MANAGEMENT OF DEVICES

(71) Applicant: BULL SAS, Les Clayes Sous Bois (FR)

(72) Inventors: Malo Jennequin, Galluis (FR); Mustapha Michrafy, Paris (FR)

(73) Assignee: BULL SAS, Les Clayes Sous Bois (FR)

( * ) Notice: Subject to any disclaimer, the term of this patent is extended or adjusted under 35 U.S.C. 154(b) by 137 days.

(21) Appl. No.: 15/541,215

(22) PCT Filed: Dec. 3, 2015

(86) PCT No.: PCT/FR2015/053305
§ 371 (c)(1),
(2) Date: Nov. 6, 2017

(87) PCT Pub. No.: WO2016/107996
PCT Pub. Date: Jul. 7, 2016

(65) Prior Publication Data
US 2018/0152313 A1    May 31, 2018

(30) Foreign Application Priority Data

Dec. 31, 2014 (FR) ...................................... 14 63494

(51) Int. Cl.
*G06F 15/173* (2006.01)
*H04L 12/28* (2006.01)
(Continued)

(52) U.S. Cl.
CPC ............ *H04L 12/2818* (2013.01); *G06F 9/54* (2013.01); *G06F 15/16* (2013.01);
(Continued)

(58) Field of Classification Search
CPC ............. H04L 12/2818; H04L 12/6418; H04L 47/803; H04L 67/12; G06F 9/54; G06F 15/16; H04Q 9/00
See application file for complete search history.

(56) References Cited

U.S. PATENT DOCUMENTS

2009/0019104 A1   1/2009   Justen et al.
2014/0244710 A1*  8/2014   Sharma .................. H04L 67/12
                                                                709/201
(Continued)

FOREIGN PATENT DOCUMENTS

CN          201854450 U  *  6/2011

OTHER PUBLICATIONS

Angel Asensio, et al, "Protocol and Architecture to Bring Things into Internet of Things", Apr. 13, 2014, Hindawi Publishing Corporation, pp. 1-20 (Year: 2014).*

(Continued)

*Primary Examiner* — Jonathan A Bui
(74) *Attorney, Agent, or Firm* — Kenealy Vaidya LLP

(57) ABSTRACT

Some embodiments are directed to a communication box for the management of a plurality of user devices including sensors and actuators installed in a predefined environment, this box including a first communication interface for recovering at least one measurement measured by at least one sensor of the plurality of user devices; a second communication interface for communicating at least one command to at least one actuator of the plurality of user devices; and an isolator for isolating the resources for the recovery of the first data item and for the communication of the command.

19 Claims, 31 Drawing Sheets

(51) Int. Cl.
  *G06F 15/16* (2006.01)
  *H04L 12/64* (2006.01)
  *G06F 9/54* (2006.01)
  *H04L 12/927* (2013.01)
  *H04L 29/08* (2006.01)
  *H04Q 9/00* (2006.01)

(52) U.S. Cl.
  CPC ........ *H04L 12/6418* (2013.01); *H04L 47/803* (2013.01); *H04L 67/12* (2013.01); *H04Q 9/00* (2013.01)

(56) References Cited

U.S. PATENT DOCUMENTS

| | | | | |
|---|---|---|---|---|
| 2015/0071139 | A1* | 3/2015 | Nix | H04W 4/70 370/311 |
| 2016/0028856 | A1* | 1/2016 | Kao | H04L 67/16 709/203 |
| 2016/0044719 | A1* | 2/2016 | Sidhu | H04W 76/10 370/329 |
| 2017/0331860 | A1* | 11/2017 | Ofversten | H04W 4/70 |
| 2018/0108983 | A1* | 4/2018 | Chen | H01Q 1/42 |

OTHER PUBLICATIONS

International Search Report and Written Opinion for PCT Patent App. No. PCT/FR2015/053305 (dated Feb. 16, 2016) with English translation of the ISR.

Geoffray, N., et al., "I-JVM: a Java Virtual Machine for Component Isolation in OSGi," Dependaable Systems & Networks, 2009, IEEE/IFIP International Conference on, IEEE, Piscataway, NJ US, Jun. 29, 2009, pp. 544-553, XP031742436.

Asensio, A., et al., "Protocol and Architecture to Bring Things into Internet of Things," International Journal of Distributed Sensor Networks, vol. 2014, Apr. 14, 2014, pp. 1-18, XP055231416.

King, J. C., "Atlas: A service-oriented sensor and actuator network platform to enable programmable pervasive computing spaces," May 1, 2007, pp. 10119, XP055248768, http://etd.fcla.edu/UF/UFE0019387/king_j.pdf [retrieved Feb. 9, 2016].

Bing, Q., et al., "A Multi-Agent System for Building Control," Intelligent Agent Technology, 2006, IEEE/WIC/ACM International Conference on, IEEE, PI, Dec. 1, 2006, pp. 653-659, XP031002986.

Gunalp, O. N., "Continous deployment of pervasive applications in dynamic environments," Nov. 13, 2014, pp. 1-272, XP055231539, https://tel.archives-ouvertes.fr/tel-01215029/document, [retrieved on Nov. 26, 2015].

\* cited by examiner

BOX FOR COMMUNICATION AND MANAGEMENT OF DEVICES

CROSS REFERENCE TO RELATED APPLICATION(S)

This application is a national phase filing under 35 C.F.R. § 371 of and claims priority to PCT Patent Application No. PCT/FR2015/053305, filed on Dec. 3, 2015, which claims the priority benefit under 35 U.S.C. § 119 of French Patent Application No. 1463494, filed on Dec. 31, 2014, the contents of each of which are hereby incorporated in their entireties by reference.

BACKGROUND

Some embodiments relate to a communication and equipment management box, in a multi-vendor and multiservice system, allowing the management of data of a set of objects or of equipment connected to a network.

With the emergence of the Internet of things, more and more services are being offered to individuals and professionals, by way of examples, services for residences or offices including connected objects. In a home-automation context, it is possible via equipment/objects including sensors and actuators, deployed in a house and connected to a network, to offer services providing or ensuring:
  domestic comfort, making it possible
    to automate and control items of equipment from a fixed station, or remotely, by way of examples: via a remote control, a laptop computer, or a telephone;
    to automate actions by virtue of geo-location, by way of the following examples: open a gate, turn on the heating, manage the lighting, activate an alarm;
  energy savings, making it possible
    to avoid waste by eliminating needless expenditure;
    to ensure an optimal level of comfort;
    to curb the consumption of electricity by optimizing, by way of examples: heating, lighting or production of hot water;
  residential protection by systems making it possible
    to supervise the frail, elderly or handicapped;
    to monitor children so as to prevent any risk of accident;
    to detect break-ins, people falling, water leaks, and trigger an alarm if appropriate.

SUMMARY

However, existing systems offering these services exhibit diverse drawbacks or limitations:
  the players of the Internet of things are numerous and varied, by way of examples: manufacturers of connected items of equipment, publishers/distributors of home services, telecommunications operators, energy companies, insurers. A player usually provides an offer based on a certain number of items of equipment, sensors, and/or actuators, selected via another identified supplier. This therefore may require tight collaboration between the player concerned and the research and development teams of the identified supplier, with a view to offering a product integration solution. Certain players of the Internet of things offer, for their part, a wide variety of connected items of equipment, while at times remaining their own developer of user services. Although the collaboration with the research and development teams is then made easier, these players are still, however, incapable of integrating items of equipment of distinct suppliers into their platforms, these platforms being proprietary. More generally, the set of solutions integrated into one and the same platform are customarily solutions in which items of equipment of determined vendors are integrated a priori. The possibilities for a posteriori integrations of items of equipment, of sensors, and/or of actuators, remain for their part very limited. These possibilities are furthermore dependent on the characteristics of the supplier solutions which are apt to evolve, for example dependent on the proprietary protocols employed and on their upgrades. Consequently, these solutions lack adaptability;
  the connected items of equipment, sensors or actuators of systems offering services, are generally proprietary, that is to say pertain to one and the same vendor/supplier. A communication box then ensures the interconnection of the various items of equipment, sensors or actuators with service platforms or external networks. Thus, for various services provided by different vendors, the user is often compelled to use a communication box per vendor, thereby involving ergonomics problems in his residence;
  the proprietary items of equipment connected to one and the same communication box are heterogeneous and customarily rely on different non-standardized communication protocols. Consequently, within the framework of a multi-vendor context, if an item of equipment changes, its communication protocol likewise changes frequently. This involves a dependency of the box in relation to the items of equipment, the box then having to support the new protocol of the item of equipment, that is to say guarantee accesses and exchanges with this new item of equipment;
  several vendors may be led, with their agreements, to offer distinct services on one and the same box. Multivendor services are therefore then executed in parallels on the same box. This does not, however, involve sharing all or most of the data or resources associated with these services, vendors not wishing for example to share confidential data. Moreover, the execution of one service must or should be able to proceed independently of the other services executed in parallels, for example independently of the memory resources used by other user services. Thus, the malfunctioning of a service must or should not impact the resources of the neighboring services. Requirements therefore exist for "partitioning" the services executed in parallels on one and the same box, particularly for user services arising from different vendors;
  suppliers/providers responsible for developing user services may want to access a set of reliable data with a view, for example, to designing residential services without necessarily being an equipment supplier. In a multi-vendor and multiservice context, it is in particular appropriate to deploy services on a platform, the latter guaranteeing at one and the same time access to reliable data originating from items of equipment of distinct vendors, and ensure communication as well as the control of these items of equipment. Generally, equipment suppliers offer equipment with possibilities to control them remotely, access their data, devise scenarios, and support protocols (for example KNX, Zigbee, Z-Wave). However, the services offered by these providers/suppliers are limited to the item of equipment alone, or relate to just a single supplier/ vendor. The service provider must or should consequently be an equipment supplier and does not have access to the data generated by the multi-vendor equipment. The equipment supplier therefore possesses data of very reduced scope, greatly limiting the information useful to the formulation of a user service. In particular, there does not currently exist any platform making it possible to group together a set of multi-vendor and multiservice data, with a view to guaranteeing centralized access to these data, the control of multi-vendor equipment and the devising of multiservice scenarios (e.g.: trigger the heating below a threshold temperature). The production of such a platform involves technical problems relating to the security of the data, access thereto as well as the management of the exchanges between such a platform and the equipment.

Some embodiments are directed to addressing all or most of the aforementioned problems.

For this purpose, there is proposed, according to a first aspect, a communication box for the management of a plurality of items of user equipment including sensors and actuators installed in a predefined environment, this box including a first communication interface for retrieving at least one measurement measured by at least one sensor of said plurality of items of user equipment;

a second communication interface for communicating at least one command to at least one actuator of said plurality of items of user equipment;

means for isolating the resources for the retrieval of said first item of data and for the communication of said command.

Advantageously, in this communication box, said measurement is retrieved according to a first communication protocol and said command is communicated according to a second communication protocol, the first protocol being different from the second protocol.

Advantageously, this communication box is, furthermore, configured to transmit at least one item of data to a central data platform.

Advantageously, this communication box possesses a private address not addressable from said central data platform.

Advantageously, in this communication box, said item of data is a parameter associated with an item of equipment of said plurality of items of user equipment.

Advantageously, this communication box includes, furthermore, an application programming interface.

Advantageously, this communication box is, furthermore, configured to receive said command.

There is proposed, according to a second aspect, a local area network including said communication box summarized above.

Advantageously, this local area network includes, furthermore, an integrated access device interfaced with said communication box.

BRIEF DESCRIPTION OF THE DRAWINGS

Other objects and advantages of some embodiments will become apparent in the light of the description of embodiments which is given subsequently with reference to the appended drawings in which.

DETAILED DESCRIPTION OF THE EMBODIMENTS

Figure 1:
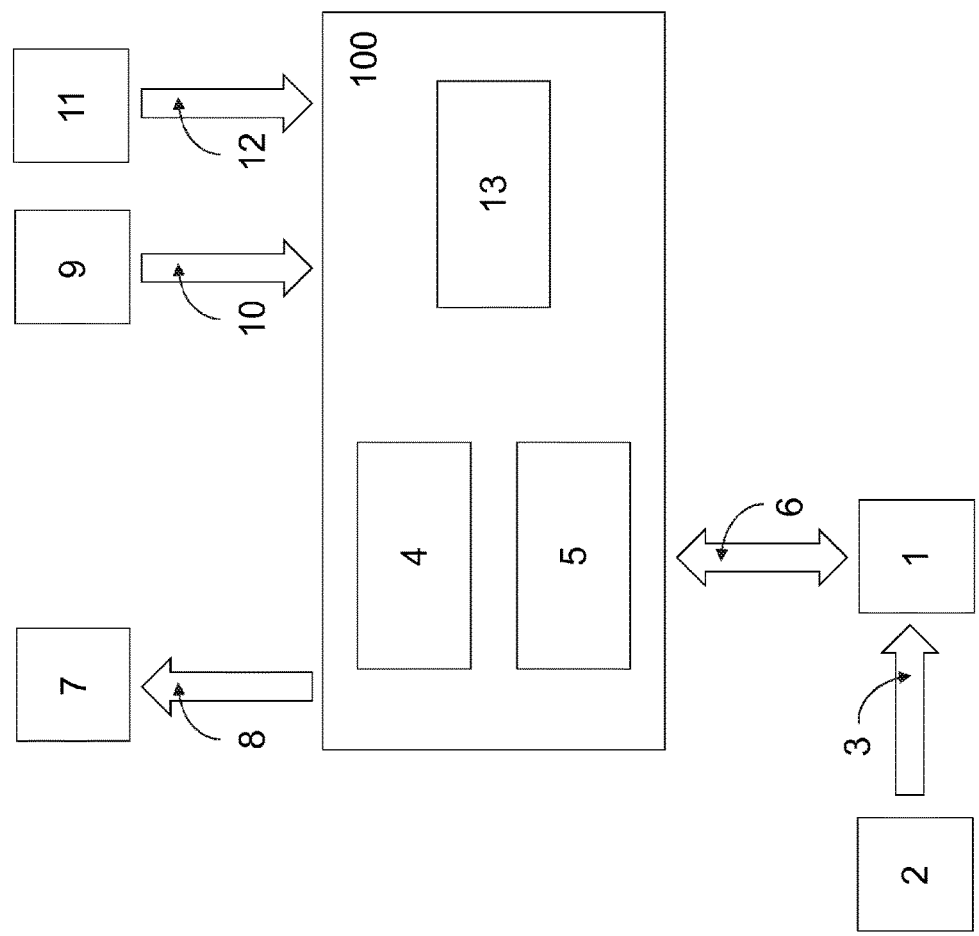
FIG. 1 is a diagram representing a system for managing multi-vendor and multi-service data according to one embodiment.

FIG. 1 is a diagram representing a system 100 for managing multi-vendor and multi-service data according to one embodiment. The data management system 100 is interfaced with the following entities:
  one or more items of equipment 1 disposed locally in a predefined place or physical environment, for example in an indoor environment such as a residence or an office. The items of equipment 1 are provided (arrow 3) by equipment suppliers 2, that is to say technological manufacturers. Advantageously, the items of equipment 1 include sensors and make it possible to upload to a central data platform 4, through the intermediary of a communication box 5, quantifiable data and/or data in respect of change of states associated with the measurements or state logs of said sensors (e.g.: temperature measurement, position of a switch associated with a lighting system). Accordingly, the items of equipment 1 are connected to the communication box 5 by way of a wired or wireless network. For its part, the communication box 5 exchanges, locally or remotely, data with the central data platform 4, by way of another network, for example the Internet. Furthermore, the items of equipment 1 make it possible to perform physical actions (e.g.: turn on the heating) through the intermediary of one or more actuators. Typically, an actuator performs an action subsequent to the reception of an action notification communicated from the communication box 5. The data exchanged between each item of equipment 1 and the communication box 5, for example uploads of data measured by the sensors or action notifications destined for an actuator of an item of equipment 1, are communicated according to or a several protocols 6 symbolized by a double arrow. By way of examples, a protocol 6 associated with an item of equipment can be a KNX, Zigbee, Wifi or Z-wave protocol;
  providers 7 of user services, typically players from the Internet world, formulating and providing the user with user services targeted at a particular domain, for example services relating to security, to comfort, or to well-being. Advantageously, these providers 7 of user services possess a complete business logic and carry out user services on the basis of data and of elementary services, provided beforehand to the central data platform 4. Advantageously, these providers 7 of user services interface (arrow 8) with the central data platform 4 according to a service architecture oriented mode, customarily referred to by the initials SOA (the acronym standing for "Service Oriented Architecture");
  data providers 9 from the Internet world, providing for example meteorological data, news or else arising from social networks, making it possible to upload quantifiable data (e.g.: weather measurements) or change-of-state data. Advantageously, these data providers 9 also interface (arrow 10) with the central data platform 4 according to an SOA service architecture oriented mode;
  suppliers 11 of elementary services, players from the Internet world, providing elementary services to the central data platform 4 (e.g.: implementation of a notification service), these services being used by the user service providers 7, as "basic" services making it possible to carry out the user services. Advantageously, these elementary service providers 11 also interface (arrow 12) with the central data platform 4 according to a service architecture oriented mode SOA.

Moreover, any supplier may optionally play a plurality of roles. For example, a data provider 9 can also be an item of equipment supplier 2 and a provider 7 of user services.

Advantageously, the data management system 100 takes several dimensions into account:
  a multi-service dimension, that is to say integrates and offers a plurality of types of user services, for example home-automation and e-health;
  a multi-vendor dimension, the items of equipment 1 supported by the system 100 may originate from different manufacturers, and include characteristics specific to each of these manufacturers;
  a multi-level dimension, the data and the elementary services may be provided:
    at the level of the items of equipment 1 by at least one communication box 5;
    at the level of the data management system 100. For example, the system 100 carries out an analysis of data provided by items of equipment 1 or data providers 9, these data optionally being abstracted beforehand to safeguard their confidentiality. The results of the analysis then allow the system 100 to make available correlations, trends, predictions on these data;
    at the level of the user service providers 7, by the provision via the data management system 100 (optionally abstracted beforehand), of trends/correlations relating to these data, and of elementary services for carrying out the user services.

Accordingly, the data management system 100 includes the following entities, the manner of operation of which will be detailed further subsequently:
  the communication box 5 which can, for example, be deployed at the user's residence. This box makes it possible to interconnect one or more items of equipment 1 via a wired or wireless link according to a predetermined protocol dependent on the manufacturer (e.g.: TCP/IP, ZigBee, Wifi) and to exchange data with the central data platform 4. Advantageously, the communication box 5 makes it possible to manage multi-vendor items of equipment 1, that is to say it supports and manages a plurality of protocols, as well as the identifications and isolations of the data/resources of each of the services executed in parallel in this box;

to guarantee secure and reliable communication with the central data platform 4;

to provide the central data platform 4 with utilizable multi-vendor data arising from the sensors of the items of equipment 1;

to receive notifications arising from the central data platform 4, pertaining, by way of examples to a remote handling for administration or a dispatch of action(s) to be executed by one or more items of equipment 1 to which it is interconnected;

the central data platform 4 concentrating and federating the totality of the data originating from the communication boxes 5 deployed in diverse places (e.g.: residences, offices), the data arising from the data providers, as well as the elementary services desired in this embodiment for the formulating of new user services. Advantageously, the central data platform 4 is configured to:

ensure centralized and organized storage of the data, the data can for example be organized as a function of their structure: raw data arising from the sensors and consolidated, aggregated and/or abstracted. By way of example, for confidentiality reasons, raw data uploaded from a sensor can be formatted/structured by the central data platform 4 according to a pivot format, making it possible to abstract these data, such as a format of XML type;

of their origin: data arising from the sensors, uploaded by the items of equipment 1 or originating from an external data provider 9;

of their right of access and of their identification: a provider 7 of user services can have access which is limited to a certain type of data;

ensure the segregation of the data and elementary services. Advantageously, this makes it possible in a multi-vendor environment to enable a set of user service providers 7 to benefit from the rich and multiple nature of the data, and to do so in a controlled manner by identification and authentication of the consumers of these data, here the user service providers 7;

restriction of accessibility to the data/services, in accordance with the rights of the consumers of these data;

tracking of the use of the consumptions of data/services for each of these consumers;

ensure the confidentiality of the data, for example, anonymization of the data via an abstraction method (e.g.: abstraction of the data according to one and the same pivot format);

federate a set of elementary services provided by the elementary service providers 11, so as to possess a global, coherent and controlled ecosystem;

provide the elementary services to the user service providers 7 for the production of said services, by way of examples, services of workflow type, or services for processing complex events CEP (the acronym standing for "Complex Event Processing");

guarantee secure and reliable communication with the various communication boxes 5;

provide utilizable data to an analytical module 13 termed "Big Data Analytics";

a mega-data analytical module 13 (termed "Big Data Analytics") configured to analyze the data of the central data platform 4 with which it is interfaced. The mega-data analytical module 13 makes it possible in particular to establish, and then make available to the user service providers 7, correlations, trends, and/or predictions of the data recorded in the central data platform 4, by generating analysis reports ("reporting" services).

Advantageously, the data arising from the central data platform 4 are identified, and then classified as a function of a pre-established data topology. By way of example, FIGS. 2 to 7 illustrate an embodiment of pre-established data topology, according to a Unified Modeling Language, acronym UML, this topology is detailed subsequently.

According to diverse embodiments, a data topology is used by the central platform 4 or the mega-data analytical module 13 ("Big Data Analytics") to classify the data recorded in the central data platform 4. Thus, in one embodiment, a data topology describing a data classification model is prerecorded in the central data platform 4, and exploited by the latter to classify the data. By way of example, the central data platform 4 is configured to identify the provenance of a data item, for example a measurement arising from a sensor by sound reading its header, and then as a function of its provenance classify it according to the prerecorded topology. In another embodiment, a pre-established topology is prerecorded in the mega-data analytical module 13. The latter is then configured to order/structure the data of the central data platform 4, in a database of this platform (e.g.: a NoSQL base). In another embodiment, the functions of the central data platform 4 and of the mega-data analytical module 13 are carried out by one and the same module (not represented).

Advantageously, the data recorded/manipulated in the central data platform 4 take the form of business objects, that is to say of data structures relating, by way of examples, to items of equipment 1, objects, places or entities interfacing and exchanging data with the data management system 100. In one embodiment, in a home-automation context, the data management system 100 includes the following business objects:

"Residence": each residence is associated with a unique identifier on the platform, identified by a type (e.g.: individual, company) and associated with its own specific characteristics (boxes, items of equipment, sensors, actuators);

"Box": this object refers to any communication box 5 encapsulating services/functionalities and supporting various communication protocols. At least one communication box 5, that is to say a "Box" object, is associated with each residence, this object including a unique identifier;

"Equipment", each item of equipment 1 is installed in a residence, is linked solely to a single communication box 5, and includes a unique identifier;

"Sensor", a sensor makes it possible to measure a physical quantity or identify a change and is associated with a single item of equipment 1;

"Actuator", an actuator makes it possible to trigger an action subsequent to an event and is associated with a single item of equipment 1.

Moreover, in order to classify and discriminate the data recorded in the central data platform 4, as presented previously, a pre-established data topology is implemented.

Figure 2:
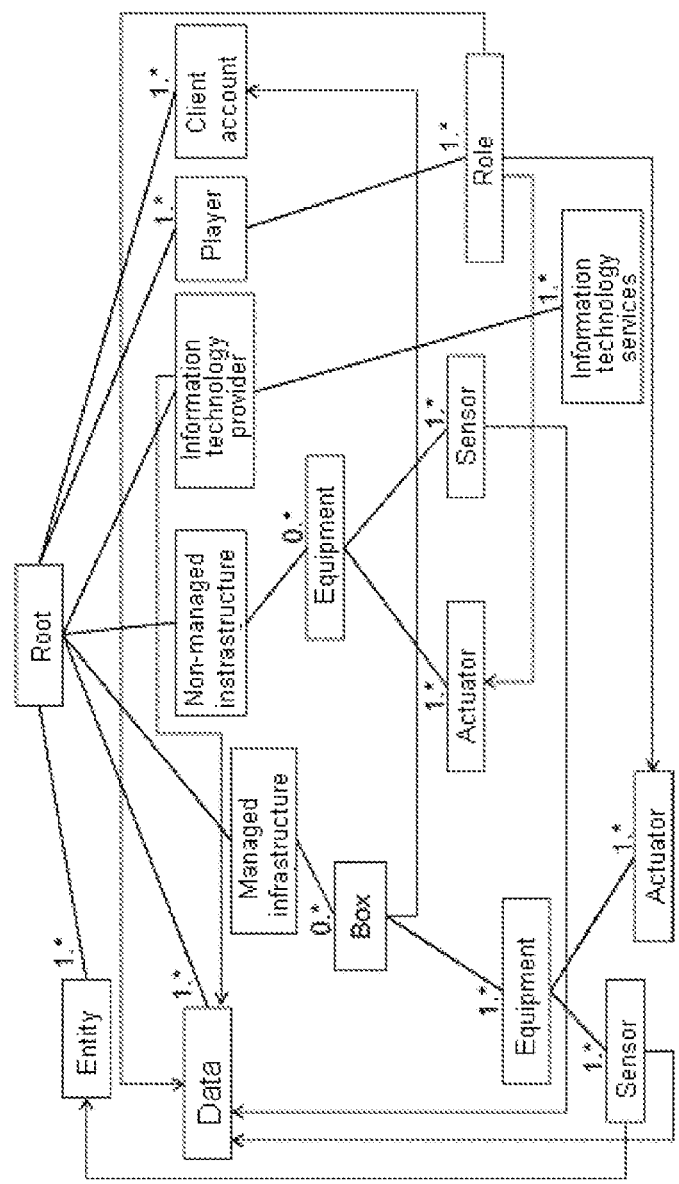
FIG. 2 is a relational scheme for modeling data according to one embodiment.

An exemplary topology is represented in FIG. 2, in the form of a tree composed of nodes and of edges, in accordance with the UML standard. This tree includes, here, a root node "Root", the other nodes pertaining to the entities of the platform. More particularly, each node of this model is associated with a class diagram, which will be described subsequently. Advantageously, the relationship between each entity is represented by an edge (link) and a cardinality. The cardinalities of FIG. 2 are proposed here by way of purely illustrative example. It is for example noted in this figure that the cardinality of the edge linking the "Root" node to the "Entity" node is "1.*" here, thus signifying that the "Root" node includes one or more class instances described in the "Entity" class. The arrows of this figure illustrate the dependencies between the various nodes, the nodes of this model being as follows:

"Entity" node: this node refers to a place, a person, an animal;

"Data" node: this node represents the data of the central data platform 4. The sources of these data are the sensors, the aggregated data of a sensor, the data arising from the data providers 9 (e.g.: environmental data, data from social networks, or more generally any Internet data);

"Infrastructure" node: this node describes the various objects relating to the residential environment, such as the "Box", "Equipment", "Sensor", "Actuator" objects cited previously. Moreover, two types of infrastructures are distinguished: managed or unmanaged. Any object associated with a communication box 5, and more generally any connected object, able to exchange data with the central data platform 4 and able to be supervised by the data management system 100, is referred to here as a managed infrastructure. Thus, a managed infrastructure is inventoried in the data management system 100 and configurable under the responsibility of this system.

Conversely, non-managed infrastructure is intended to mean any object or item of equipment 1 unable to be supervised by the data management system 100. However, such an infrastructure remains inventoried, that is to say known to the data management system 100;

"Player" node: such a node refers to the players of the platform. A player can be a user of the platform, a provider 7 of user services, an equipment supplier 2 or else a service consumer. Advantageously, the role of each player makes it possible to define the authorizations permitting access to the data and services;

"Information technology supplier" node, customarily referred to as the "IT Supplier": this node describes the set of suppliers of the central data platform 4: user service providers 7 and/or supplier 11 of elementary services;

"Client account" node: this node describes the account of a client who has subscribed to a set of services offered by the central data platform 4, or any user possessing items of equipment 1 supporting services offered by the central data platform 4.

Figure 3:
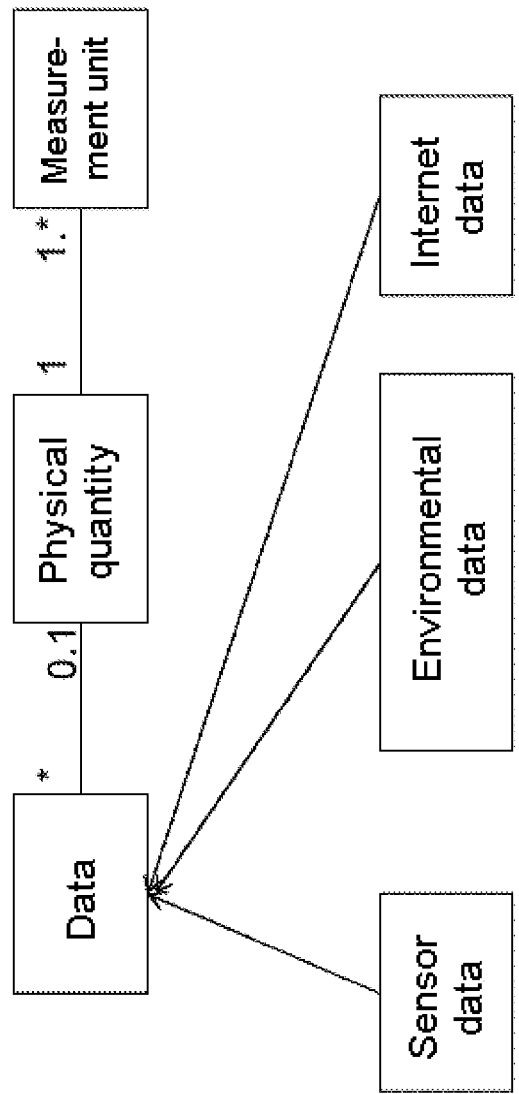
FIG. 3 is a class diagram of a node of the relational scheme for modeling data according to one embodiment.

FIG. 3 thereafter describes the class diagram associated with the "Data" node described previously, that is to say the classes inheriting the "Data" node making it possible to classify the various types of data. As may be noted in this scheme, a data item:

can include a measurement unit, for example pertain to a temperature or a pressure measured by a sensor. Furthermore, a physical quantity can be associated with a plurality of measurement units. By way of example, for a temperature measurement it is possible to associate Celsius and Fahrenheit units;

a data item might not include any measurement, for example when it pertains to a state (e.g.: open or closed state of a door);

a data item can be of media type, for example be text, an image or video.

A data item can moreover include a plurality of sources

"Sensor data": these data arise from sensors, and are for example raw data (unprocessed) returned by the sensors, or a set of data aggregated according to a predetermined structure (e.g.: structured according to a pivot format), this set pertaining to the measurements of at least one sensor;

"Environmental data": these are data which are not provided by the system 100. These data pertain to a set of aggregated data of a predetermined geographical area (e.g.: region, town) and can concern by way of examples temperatures, pressures or amounts of particles;

"Internet data" termed "Web data": these data can be text, image, video or any other multimedia medium offered by a data provider 9.

Figure 4:
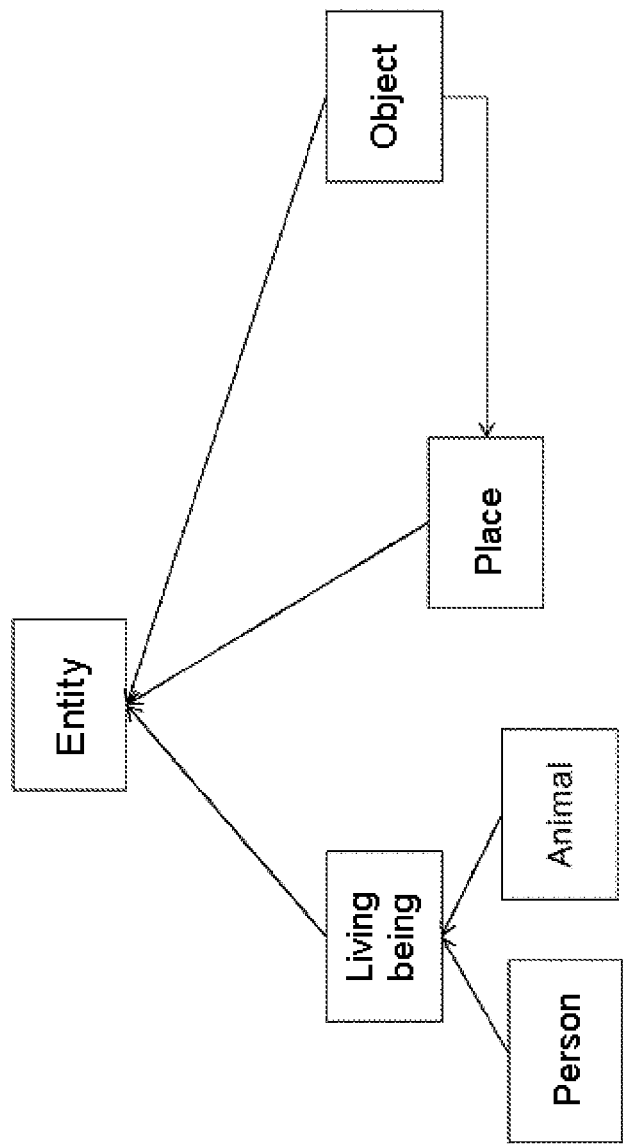
FIG. 4 is a class diagram of another node of the relational scheme for modeling data according to one embodiment.

FIG. 4 illustrates a diagram of classes describing the instances of the "Entity" node. With reference to this figure, in this topology model, a data item pertaining to the "Entity" class can be classified in one of the following instances ("sub-classes"):

"Living being" class, including as possible instances
    a "Person" class: by way of example for e-Health services a person can be equipped with sensors to measure their blood pressure, their temperature and possess a connected device (e.g.: watch) for the transmission of said measurements associated with the sensors;
    an "Animal" class: an animal can by way of example be equipped with a collar or an electronic chip making it possible to locate it;

"Place" class: any space furnished with sensors, for example a company or a residence;

"Object" class: generally any object disposed in a physical space (e.g.: office, house) using one or more sensors to measure a physical quantity or a state. By way of example, in a residence, an object can be a refrigerator equipped with a temperature sensor and send/receive means. Advantageously, a place can include a variety of objects.

Figure 5:
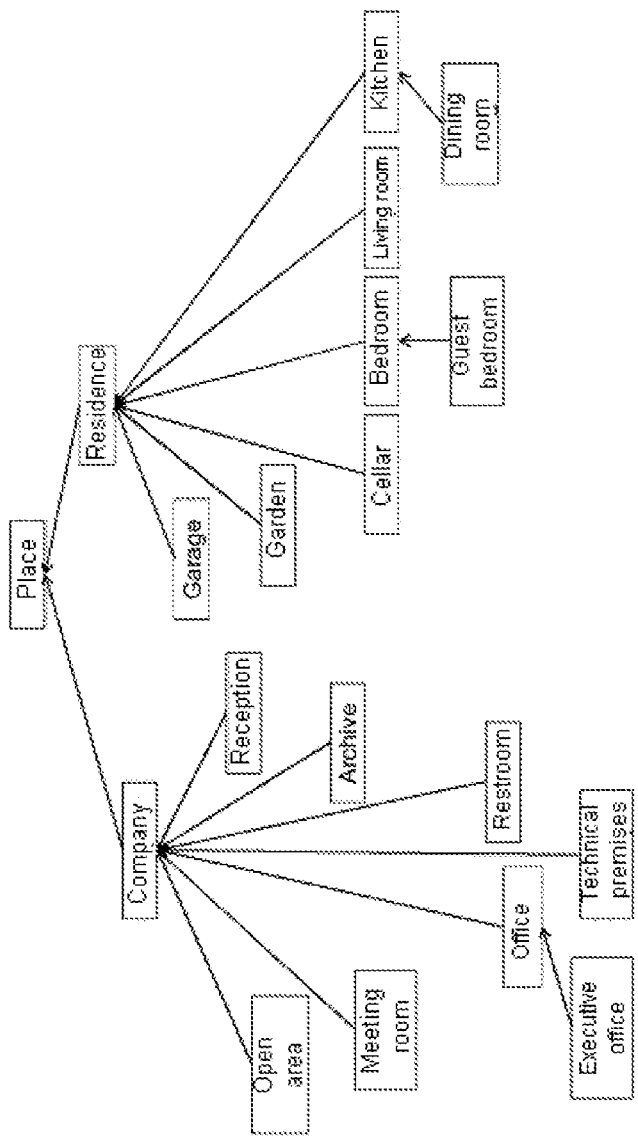
FIG. 5 is a topological diagram describing another node of the relational scheme for modeling data according to one embodiment.

FIG. 5 is a topological diagram describing the various types of place as well as their compositions. The system 100 is indeed aimed at managing the set of connected items of equipment 1 or objects deployed at various places, said items of equipment 1 or objects being themselves disposed in specific areas and furnished with sensors. In this example, a place is either a company or a residence. Thus, in this example, a data item pertaining to the "Place" class can be categorized in the "Residence" or "Company" instances.

Here the "Residence" class includes as instances the following classes: "Kitchen", "Dining room", "Living room", "Bedroom", "Guest bedroom", "Cellar", "Garden", "Garage".

The "Company" class can for its part be implemented by the following instances: "Reception", "Meeting room", "Office", "Executive office", "Open area" customarily referred to as "Open space", "Technical premises", "Archive", "Restroom".

It is understood that the modeling of these places is subsequently extensible as a function of requirements.

Advantageously, the characteristics the "Sensor" class introduced in FIG. 2, make it possible to provide data to the elementary service providers 11 for the development of reliable services. Customarily, a sensor can be described by the following characteristics:

- its range of measurement: the extreme values that can be measured by the sensor;
- its resolution: the smallest variation of quantity measurable by the sensor;
- its sensitivity: the variation of the output signal with respect to the variation of the input signal;
- its precision: ability of the sensor to give a measurement close to the true value;
- its speed: reaction time of the sensor;
- its protocol: protocol supported, communication interface used.

Figure 6:
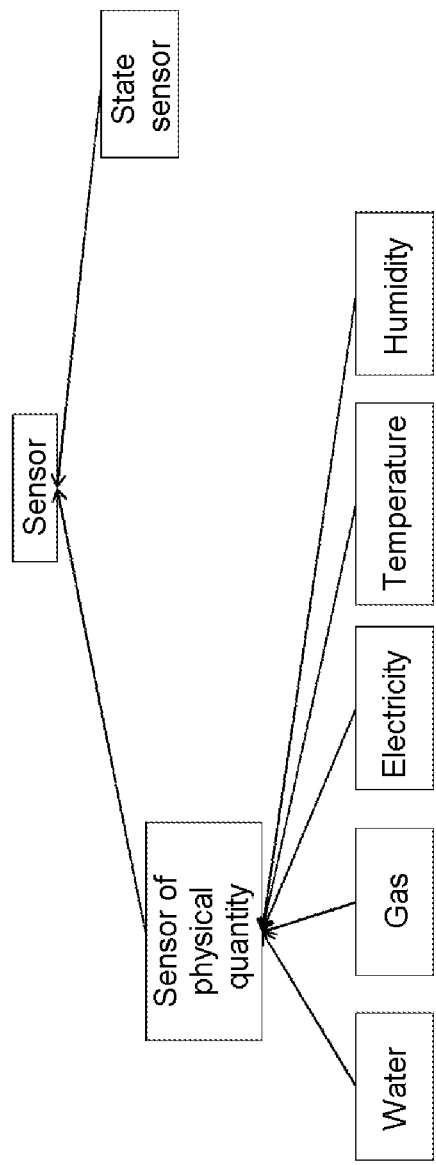
FIG. 6 is a topological diagram describing another node of the relational scheme for modeling data according to one embodiment.

FIG. 6 illustrates a topological diagram making it possible to classify a data item pertaining to the "Sensor" class. In this figure, the "Sensor" class includes as instances:

- a "Physical quantity sensor" class: this type of sensor allows measurements of a physical quantity such as a flowrate of water or gas, electricity consumption, a value of temperature or pressure, or else a humidity factor;
- a "State sensor" class: this type of sensor makes it possible to identify the state of an object, for example the state of a door (closed or open). A presence sensor, or an image sensor may be cited by way of other examples.

The "Player" node of FIG. 2 includes as instance the "Role" node, a player of the system 100 being able to aggregate various roles.

Figure 7:
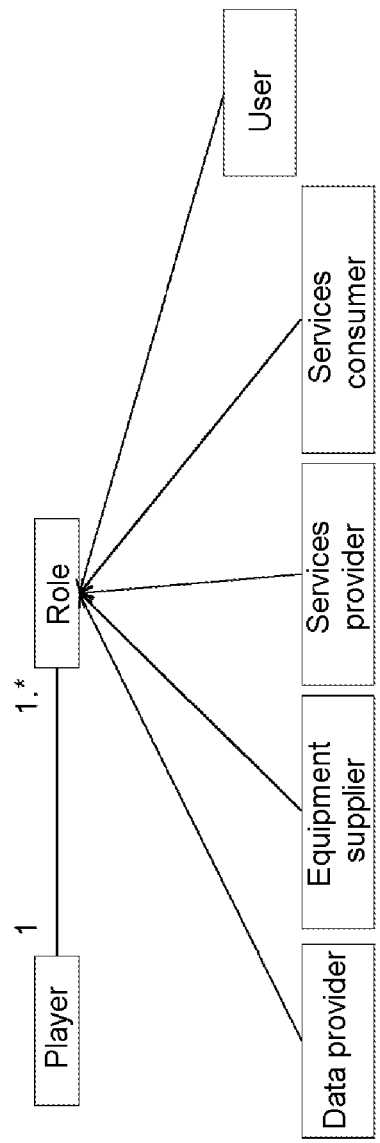
FIG. 7 is a topological subset describing another node of the relational scheme for modeling data according to one embodiment.

FIG. 7 illustrates the topological subset pertaining to the latter entity. Advantageously, the "Role" class includes the following instances:

- "Data provider" class: a data provider 9 provides data which will be utilized by the services offered by the central data platform 4;
- "Equipment supplier" class: an equipment supplier 2 provides hardware objects for the system 100 such as sensors, equipment 1, actuators;
- "Service provider" class: a provider 7 of user services provides and presents the user services on the central data platform 4;
- "Service consumer" class: this instance refers to the players utilizing services presented by the central data platform 4. By way of example, a manufacturer of electro-domestic equipment can utilize the data of the central data platform 4 to adapt its offer. Moreover, a provider 7 of user services or an equipment supplier 2 can use services presented by the central data platform 4. In this case, the player is both service provider/equipment supplier and also service consumer;
- "User" class: this instance refers to a person, situated for example in a residence or of a company, possessing at least a communication box 5.

Figure 8:
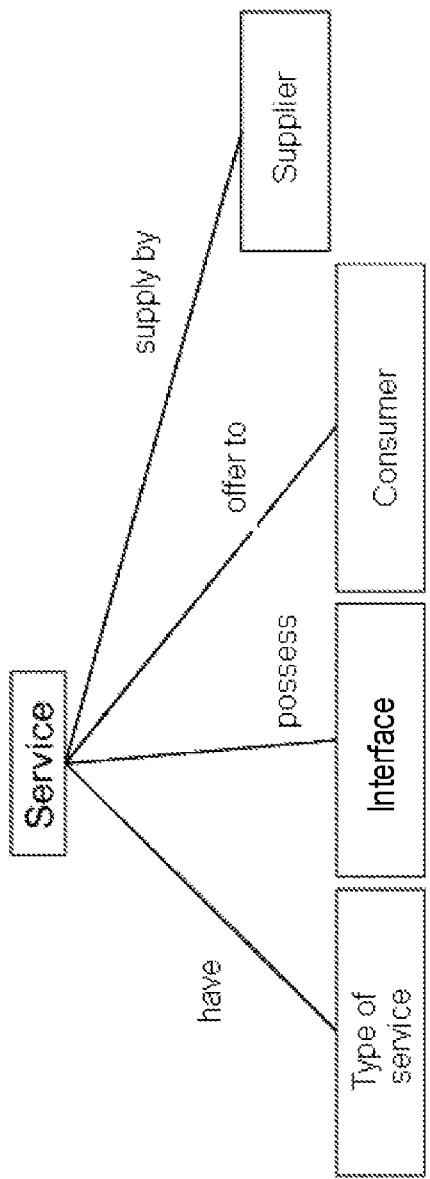
FIG. 8 is a diagram illustrating the elements relating to a service according to one embodiment.

FIG. 8, is a topological diagram illustrating, according to the UML standard, the modeling of a service. In this figure the node symbolizing the "Service" class is linked by edges to the following instances: "Supplier", "Consumer", "Interface", "Service type". Advantageously, a service of the data management system 100 includes the following characteristics:

- it is presented ("supply by" edge) by a supplier (supplier 7 of user services and/or supplier 11 of elementary services) on the central data platform 4;
- it is consumed ("offer by" edge) by players (e.g.: clients, suppliers) of the data management system 100;
- it is associated with a predetermined interface. On the central data platform 4, in the majority of cases, the service possesses ("possess" edge) a network interface;
- it is deployed on the central data platform 4, that is to say on the "Cloud", or deployed locally on the communication box 5. The place of deployment conditions the type of service ("have" edge).

Figure 9:
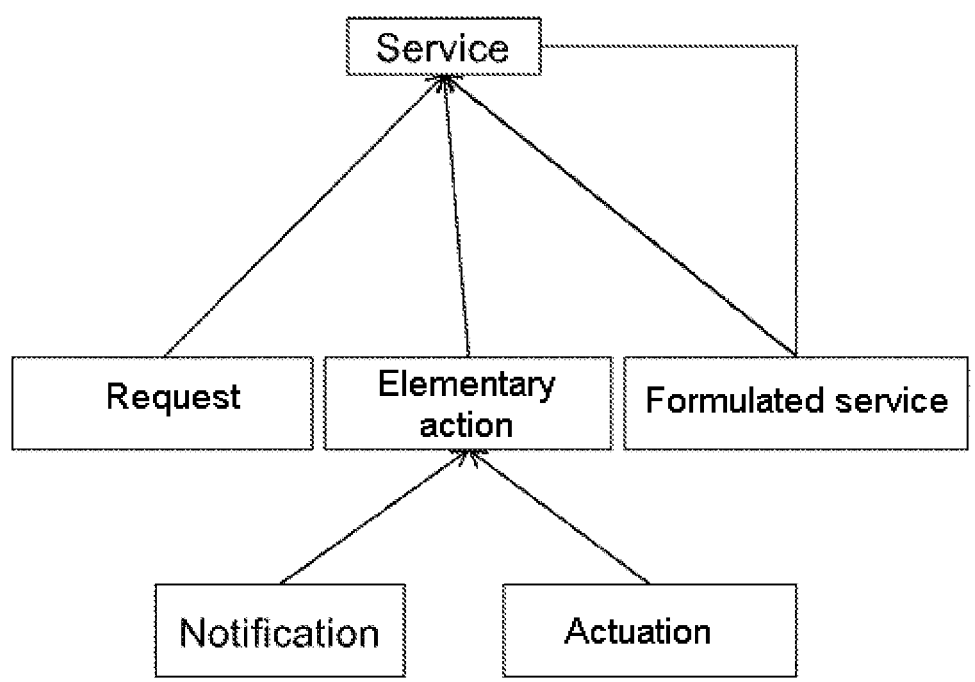
FIG. 9 is a diagram illustrating the relationship between various services according to one embodiment.

Advantageously, the data management system 100 makes it possible to provide user services and to manage these services from their technical design to their deployment. Accordingly, the central data platform 4 offers elementary services and formulated services, the latter being carried out via a determined number of elementary services. FIG. 9 illustrates the topological relationship existing between these various services. Depicted are:

- the services of request type: these services pertain to the data.

Advantageously, by interrogating via queries the constituent database of the central data platform 4, it is possible to provide data to one or more players of the system 100. By way of example, the data can be raw data relating to the sensors or aggregated data;

- the actuation services: these are the services which call upon the actuators of items of equipment 1 in order to carry out an action;
- the notification services: these services perform a set of determined operations, relying on the data stored in the central data platform 4. By way of examples, these services make it possible to carry out a diagnosis, or to advocate a scenario relating to an item of equipment 1, so as to optimize the consumption of non-renewable energies such as electricity, gas, and water;
- the formulated services: these are the services which are carried out according to a predetermined sequence of flows of tasks, customarily referred to as the "workflow". These services make it possible to carry out a set of operations, customarily by calling upon the elementary services.

Advantageously, the set of previously described nodes, as well as their topological subsets, constitute a semantic model of data. Based on this semantic model, the mega-data analytical module 13 termed "Big Data Analytics" (or the central data platform 4), is configured to apply a processing to the data recorded in the central platform 4. By way of example, the mega-data analytical module 13 classifies, segments, aggregates, abstracts and/or formats any data item of the central platform 4. For example, assuming that each data item includes an identifier characteristic of its origin, for example an identifier relating to the address of an Internet network or of a communication box 5, the mega-data analytical module 13 classifies as a function of these identifiers the raw or aggregated user data arising from the sensors, or the Internet data provided by the data providers 9. Moreover, the mega-data analytical module 13 undertakes optionally on these data an abstraction/anonymization step, making it possible to safeguard their confidentiality, and then renders them accessible to the user service providers 7.

Advantageously, the mega-data analytical module 13 offers services for various phases of use of the data stored in the central data platform 4. The following phases occur:

- watching and trends phase: this phase makes it possible to identify trends by analyzing data arising from Internet and social networks. For this phase, the mega-data analytical module 13 makes available tools and methods for analyzing data (e.g.: Pig/Hive) destined for the user service providers 7. Advantageously, these tools allow the user service providers 7 to identify themes relating to the data recorded in the central data platform 4, and to formulate statistical indicators with respect to these themes. By way of example, the mega-data analytical module 13 conducts an analysis on data arising from social networks or from queries of search engines, these data being provided by the data providers 9 to the central data platform 4. The result of the analysis carried out by the mega-data analytical module 13 is then returned to the provider 7 of user services in the form of keywords, allowing it to identify a relevant topical theme with a view to carrying out user services;

services formulation phase: this phase allows the user service providers 7 to formulate services. Accordingly, the central data platform 4 provides reliable data (optionally abstracted), and the mega-data analytical module 13 offers tools allowing the analysis of these data. According to diverse embodiments, the mega-data analytical module 13 offers statistical tools based on methods of data correlation, for example Pearson correlations for continuous quantitative variables;
  Spearman correlations for ordinal data, taking account of their ranks;
  Kendall correlations for ordinal data, taking account of their ranks;

methods of data analysis, such as
  principal component analysis (PCA) methods for studying and visualizing correlations between several variables;
  multiple correspondence analysis (MCA) methods for analyzing the link between qualitative variables;

methods of data grouping customarily referred to as "clustering".

Advantageously, the reliable data to be analyzed/correlated by the mega-data analytical module 13 are made available to the various user service providers 7 via a report service (of "reporting" type) and pertain, by way of examples, to data of the sensors, environmental data, or user data;

phase of deployment of a service: this phase allows various user service providers 7 to deploy their services in the data management system 100. For this phase, the mega-data analytical module 13 makes available to the user service providers 7 tools for managing the life cycle of the service and control tools able to guarantee prerequisites for the deployment of a service in the data management system 100;

phase of recommendation of the services: this phase implements recommendation algorithms to advocate services to the players of the data management system 100. During this phase, for example, the following are recommended: elementary services to the user service providers 7, user services and/or scenarios of use of user services to individuals. Advantageously, the recommendation services provided by the data management system 100 are based on methods of collaborative filtering. A collaborative filtering is carried out, by way of example, by the mega-data analytical module 13 by applying a method able to compare the users amongst themselves (e.g.: type of service used, type of data consumed, user behavior), or elements scored beforehand (e.g.: user services previously scored by their clients). In one embodiment, the data management system 100 offers during this phase a service of auto-setting of equipment 1. Accordingly, the setting of an item of equipment 1 is stored for a predefined period in the central data platform 4, the setting is thereafter applied to one or more other items of equipment 1 of the same type. In one embodiment, a so-called "best scenario" service is offered by the data management system 100, in order to advocate or reproduce the best scenario for a user service, such as the setting of an apparatus or the management of a resource (e.g.: water, gas, electricity). Advantageously, the best-scenario recommendation, is based on the result of an analysis conducted by the mega-data analytical module 13, this analysis being carried out on information uploaded by items of equipment 1 of a similar users category. Accordingly, grouping ("clustering") algorithms of "k-means" or "canopy" type are used. By way of example, the best-scenario service is put in place via the following steps:

selection of the item of equipment 1 or of the resource;
  segmentation of the users;
  application of a method of "canopy" type to calculate a set of clusters of users;
  application of a method of "k-means" type, so as to identify the best scenario relating to each cluster;

phase of scoring the services: this phase makes it possible to allot a score and identify the non-relevant services. The data management system 100, offers for example clients the opportunity to score the user services that they use in an on-line shop, or user service providers 7 the opportunity to score the elementary services placed at their disposal for carrying out the user services. Advantageously, such a phase makes it possible to anticipate the obsolescence of the services. Accordingly, the platform calls upon learning algorithms, based on statistical methods, for example logistic regression methods or tree methods. Advantageously, to anticipate the obsolescence of the services, the mega-data analytical module 13 is configured to associate a threshold with each service, and to calculate a score relating to said service. If the score of the service is below the threshold, then the service then identified by the mega-data analytical module 13 as obsolete, the user service providers 7 then being notified.

One of the issues with the central data platform 4 relates to access (with segregation) to the user services and data. The central data platform 4 indeed plays a pivot role in the management and the transmission of the data with the communication boxes 5, the mega-data analytical module 13 ("Big Data Analytics") and the various players/consumers of data such as the user service providers 7. Thus, in an embodiment, an item of equipment implementing the AAA protocol (the acronym standing for "Authentication, Authorization, Accounting") is associated with the central data platform 4, said item of equipment carrying out functions of authentication, authorization, and tracing of the data and services presented by the central data platform 4. Advantageously, this makes it possible to guard against the possibility of a data consumer accessing data or services to which he has no right or which are liable to deviate from the rules of private life. By way of examples, after authentication, a consumer is authorized to call a web service of REST type (the acronym standing for "Representational State Transfer") or SOAP type (the acronym standing for "Simple Object Access Protocol"), or else call a service a certain number of times per unit time (e.g.: a thousand times per month). Calling REST or SOAP services allows in particular the reading of the data emanating from the items of equipment 1 or the mega-data module 13, and allows actions to be dispatched to the items of equipment 1. Furthermore, the central data platform 4 presents one or more Application Programming Interfaces (API), and optionally a Graphical User Interface (GUI), allowing the supplying of data to the data consumers (clients, user service providers 7), data-consuming applications, and making it possible to manage the authorizations permitting access to the data, for example as a function of the roles and of preconfigured thresholds.

Advantageously, the presentation of one or more application programming interfaces API by the central data platform 4 is dedicated to the suppliers and allows:

- the elementary service providers 11 to manage a set of services ("bundles") created by the various suppliers and deployed on the central data platform 4 (e.g.: validation of the deployment, versions, pooling, statistics);
- the user service providers 7, namely the consumers of elementary services and of data, to access in an authenticated, controlled and accounted manner, through a front-end layer (e.g.: Internet site, mobile applications), the information produced by the mega-data analytical module 13 ("Big Data Analytics"), after the latter module has processed (e.g.: analyzed, correlated, grouped together, formatted, abstracted) the user data uploaded by the various communication boxes 5.

Likewise, a set of application programming interfaces API, this time dedicated to the end users, is made available on each communication box 5. Advantageously, the presentation of one or more application programming interfaces API dedicated to the end users makes it possible, through a front-end layer (e.g.: Internet site, mobile applications), to offer

- end users of equipment 1, the opportunity to purchase on-line user services, for example through the intermediary of an on-line shop offered by an application;
- access both to global information (e.g.: statistical data) pertaining to the pool of communication boxes 5, and also to individual information per purchased service (authenticated, controlled and accounted access);
- the parametrization of each user service (customized configuration);
- access to scoring and recommendation services for each purchased service.

Advantageously, the integration of the data into the central data platform 4 is seen by the various entities as an intermediate layer, ensuring the passage of the information flows between:

- the communication boxes 5, that is to say the information originating from the sensors of each item of equipment 1;
- a semantic base, such as the previously described semantic model of the data;
- the set of services accessible to the end consumer constituting a service portal;
- the application programming interfaces API constituting a services management portal. Advantageously, such a portal facilitates automated interactions with the equipment 1 or the information systems of the suppliers.

In particular, in a multi-vendor context, the various devices (equipment 1, sensors, actuators) connected to a communication box 5 can originate from various vendors, who previously have no knowledge of one another, these devices being at one and the same time supported by the communication box 5 and the central data platform 4. The central data platform 4 then makes the data originating from said devices mundane, by presenting them as services (e.g.: action, alert, data), thus allowing the development of services relating to multiple devices and/or multiple vendors, these services being deployed subsequently at the level of the central data platform 4 or of the various communication boxes 5.

Moreover, the integration of the data into the central data platform 4 makes it possible subsequently to undertake a list of actions, which is communicated by the central data platform 4 to at least one communication box 5, said box being linked to a determined number of items of equipment 1. Advantageously, these actions are determined as a function of the semantic model, and are possibly related:

- to data in respect of metrics of items of equipment 1, uploaded by a communication box 5;
- a preconfigured action-triggering event, by way of example, an action configured to be triggered at a predefined date or time;
- notifications pushed by application programming interfaces API presented by the central data platform 4, pushed for example through an Internet portal or a mobile application, pertaining to a user or supplier action request.

Thus, on receipt of an event such as a notification or a metric, the central data platform 4 via a data integration layer:

- records in a journal the event received if it is an event originating from a communication box 5. The event may optionally contain parameters associated with a determined item of equipment 1;
- with the aid of the mega-data analytical module 13 classifies the event with the aid of a the semantic base, and establishes a correlation between this event and an associated service;
- if the service exists, dispatches data associated with the event to an execution mechanism (e.g.: associated with the item of equipment 1), said mechanism being configured to generate an action associated with the service as well as with the event;
- pushes via a mechanism of "push" type the action generated to the corresponding communication box 5.

Moreover, another issue with the central data platform 4 relates to its interfacing with the communication boxes 5. The interface of the central data platform 4 with the communication boxes 5 must or should manage the data flows:

- in the downgoing direction: from the central data platform 4 to a communication box 5, for example when dispatching a command to an item of equipment 1 of actuator type;
- in the upgoing direction: from a communication box 5 to the central data platform 4, for example when uploading a measurement arising from a sensor of an item of equipment 1.

Customarily, a communication box 5 is located in an "internal" local network (e.g.: LAN) and connects to an "external" remote network (e.g.: Internet) by way of an integrated access device IAD. The integrated access device IAD is provided by an Internet network access supplier and makes it possible to exchange data flows of various kinds via a single connection. Thus, each communication box 5 previously described connects to the central data platform 4 behind an integrated access device IAD. In order to ensure a communication between each communication box 5 and the central data platform 4, the integrated access device IAD establishes a connection with the central data platform 4. To establish this connection, the integrated access device IAD and the central data platform 4 possess public addresses, while the communication box 5, situated behind the integrated access device IAD, possesses a private address, not addressable from the central data platform 4. Advantageously, such an architecture makes it possible for any communication box 5 situated behind the integrated access device IAD to be contingent on a data connection (upgoing flow) to any Internet platform in the broad sense while remaining protected from external threats. Thus, in the upgoing direction, any communication box 5 succeeds by way of the integrated access device IAD in reaching the central data platform 4, for example when uploading measurements or events returned by sensors. However, in the downgoing direction, for example for the management of actions to be dispatched to the items of equipment 1, the central data platform 4 does not possess any means making it possible to reach the communication box 5, because of its private addressing behind the integrated access device IAD. Moreover, the communication box 5 may be momentarily unavailable from the point of view of the integrated access device IAD, for examples in case of temporary disconnection or of simple electrical unplugging. Customarily, any integrated access device IAD offers a function of network address translation rules customarily referred to as NAT ("Network Address Translation"), making it possible to map a public address/an output port of the integrated access device IAD with a corresponding private address/an input port relating to a communication box 5. However, such a function is not carried out by default and may require for its activation the configuration of rules.

Furthermore, the development of mechanisms allowing the remote handling (e.g.: for administration) and the dispatching of an action to items of equipment 1, connected to a communication box 5, from the central data platform 4, is not implemented in the current architecture.

According to diverse embodiments, the remote handling and the dispatching of an action to one or more items of equipment 1, connected to a communication box 5, from the central data platform 4, are carried out by the implementation of four mechanisms, whose general manner of operation is briefly recalled here:

communication mechanism of "tunnel via proxy" type. Customarily, for this mechanism, a communication box 5 establishes a connection via a Transmission Control Protocol, TCP. This connection is established via the creation of a tunnel from the communication box 5 to a proxy server associated with a remote platform. Thus, in the embodiments developed subsequently, a tunnel is established between a communication box 5 and a proxy disposed in the central data platform 4. The tunnel is then kept open by the communication box 5, for example via the dispatching of dummy packets, or re-opened in case of disconnection. The creation of this tunnel is performed in the upgoing direction, that is to say from the communication box 5 to the central data platform 4. The establishment of the tunnel allows, subsequently, upgoing or downgoing information to travel between the communication box 5 and the central data platform 4. Advantageously, by virtue of the proxy, the central data platform 4 then sees the communication box 5, as if the integrated access device IAD were absent and implements a bidirectional data exchange mechanism. Such a mechanism nonetheless remains a heavy consumer of resources on the proxy servers because of keeping TCP connections open with the various communication boxes 5;

communication mechanism based on the "Internet gateway device" control protocol, subsequently referred to as the IGD protocol, the acronym standing for "Internet Gateway Device Protocol". The IGD protocol is described in the UPnP standard (the acronym standing for "Universal Plug and Play"). Customarily the "boxes" of the operators, that is to say the integrated access devices IAD in this document, offer functions of router, "firewall" and "UPnP" type. Certain network applications, such as applications of P2P peer-to-peer type, sometimes offer during their installation on a computing machine an automatic configuration option via the use of a mechanism of "UPnP" type. The principle of this mechanism can include or can consist of, via a UPnP controller present in the integrated access device IAD, in configuring via the IGD protocol, an NAT "network address translation" function for the firewall. This configuration makes it possible in particular to establish a correspondence (or "mapping") between the public ports/the public addresses of the IAD, and the private ports/private addresses of connected objects behind the firewall of the IAD, and to do so in a user transparent manner. For example, via the NAT function, the IGD protocol establishes a correspondence between a private address and a private port to a communication box 5 deployed in a local network, and a public address and a public port to the central data platform 4 deployed on Internet. Advantageously, the use of this mechanism then allows the central data platform 4 to then see the communication box 5, as if the integrated access device IAD were absent and offers a bidirectional data exchange mechanism. This mechanism nonetheless exhibits risks of security type: the reconfiguration of the firewall is potentially open to any third-party software connected to the local network of the IAD, and once the "mapping" has been put in place, the communication box 5 is potentially exposed to risks of attacks arising from the Internet. Moreover, such a mechanism may require the support of the UPnP by the IAD and that this function be activated in the IAD;

communication mechanism using the "Extensible Messaging and Presence" Protocol, referred to subsequently as the XMPP protocol. This messaging protocol is based on the TCP, XML protocols and replaces the Jabber protocol which is an instant messaging protocol. The XMPP protocol is described in the TR-069 specification. In particular, annex K.2 of version 1.4 of this specification (November 2013), describes a mechanism using the XMPP protocol to deal, via the NAT function, with the problem of a "Connection Request" destined for an "Item of equipment of the subscriber premises" customarily referred to as the CPE, the acronym standing for "Customer Premises Equipment". A CPE is, by way of example, the communication box 5 deployed in a local network. For the sake of understanding, this annex is summarized here, it being possible to find additional details therein:

an Auto-Configuration Server ACS establishes a connection with an XMPP server. The ACS auto-configuration server and the XMPP server are, by way of example, installed in an Internet network;

said ACS auto-configuration server activates the use of the XMPP protocol at the level of a CPE by the configuration of an XMPP object "XMPP Connection object", while optionally providing a set of authorized Jabber identifiers;

said CPE establishes an XMPP connection (through the uplink) with the XMPP server;

when the ACS auto-configuration server seeks to communicate with the CPE it dispatches an "XMPP Connection Request" message to said XMPP server.

This message is an XMPP "strophe", customarily referred to as an "XMPP IQ Stanza", and includes a "Connection Request" indicating as origin an authorized Jabber identifier, pertaining to the ACS auto-configuration server, and indicating as destination an identifier relating to the CPE.

the XMPP server then transmits the "XMPP IQ Stanza" message to the appropriate CPE;

the CPE dispatches in return an "Inform Request" message destined for the ACS auto-configuration server.

In the embodiments described subsequently, the ACS auto-configuration server is associated with the central data platform 4. Advantageously, this then makes it possible to carry out a mechanism of "wakeup" type, making it possible to decrease the consumption of resources with respect to the previous mechanisms: any CPE, for example each communication box 5, is forewarned ("wakeup") that it must or should contact the central data platform 4 through an upgoing flow so as to retrieve in return the downgoing data flow. Advantageously, such a mechanism allows an improvement in the security of the communication box 5;

communication mechanism based on the "simple traversal of UDP through NATs" protocol, referred to subsequently as the "STUN" protocol, the acronym standing for "Simple Traversal of UDP through NATs". The STUN protocol allows an application of a CPE (e.g.: the communication box 5) connected to an IAD behind a firewall, to discover the possible presence of an NAT function (that is to say a gateway) of the IAD, and obtain the correspondence ("mapping") of the application with the public address and the UDP ("User Datagram Protocol") port of the integrated access device IAD allotted by the NAT gateway. The use of this protocol may require the assistance of a third-party, namely a STUN server deployed in a public network such as the Internet. The STUN protocol is described in the TR-111 specification ("Applying TR-069 to Remote Management of Home Networking Devices", December 2005). In particular, the part "2.2 Procedures" of this specification describes the procedure of the STUN protocol in order that a CPE may receive a UDP connection request from a remote ACS auto-configuration server. The ACS auto-configuration server and the STUN server are deployed on the side of the public address of the NAT function of the integrated access device IAD. For the sake of understanding, part 2 of the TR-111 specification is summarized here, it being possible to find additional details therein:

the ACS auto-configuration server activates the use of the STUN protocol for the CPE (if this configuration is not activated by default) and designates a STUN server to communicate with the CPE;

the CPE then uses the STUN protocol, to discover if it is situated behind an NAT gateway with an allocated private address;

if so, the CPE uses the procedure defined by the STUN standard to discover the expiry of its data link behind the NAT gateway ("binding timeout");

in order to perform the "mapping" step the CPE periodically dispatches STUN binding requests destined for the STUN server, termed "STUN Binding Requests". This makes it possible to keep open the link of the CPE via the NAT gateway, this link allowing the CPE to listen for possible UDP connection requests;

when the CPE determines the public IP address and the public port used for the link of the NAT gateway (used to listen for "UDP Connection Requests" messages), the CPE transfers the "mapping" information determined to the ACS auto-configuration server, for example via the dispatching of a "STUN Binding Request" message;

the ACS auto-configuration server then establishes a UDP connection with the CPE, via the dispatching of a UDP connection request message to the port and the public address of the NAT gateway, which are determined by the CPE.

In the embodiments described subsequently, the ACS auto-configuration server and the STUN server are associated with the central data platform 4. Advantageously, this then makes it possible to carry out a mechanism of "wakeup" type, making it possible to decrease the consumption of resources with respect to the previous mechanisms: any CPE, for example each communication box 5, is forewarned ("wakeup") that it must or should contact the central data platform 4 through an upgoing flow so as to retrieve in return the downgoing data flow. Advantageously, such a mechanism is a fairly light consumer of resources on the central data platform 4. However, the periodic dispatching of "STUN Binding request" requests which leaves open the NAT gateway, potentially exposes the CPE to external attacks.

The table below catalogs the advantages and drawbacks of each of the mechanisms previously introduced:

|  | Tunnel | UPnP | XMPP | STUN |
|---|---|---|---|---|
| Security | Strong | Weak | Strong | Weak |
| Implementation | Complex | Complex | Easy | Complex |
| Consumption | Heavy | Light | Average | Light |
| IAD Dependency | Weak | Average | Weak | Average |

Currently, the mechanisms introduced hereinabove do not allow the remote handling (e.g.: for administration) and the dispatching of an action to items of equipment 1, connected to a communication box 5, from the central data platform 4.

Thus, after implementation, each of the mechanisms introduced hereinabove will be able to offer remote handling, as well as the dispatching of an action to items of equipment 1 connected to a communication box 5.

According to diverse embodiments, during the deployment of the data management system 100, particularly the communication boxes 5, one or more of these four mechanisms is chosen as a function of the technical and operational constraints. Advantageously, a single mechanism is selected for each communication box 5 as a function, by way of examples, of the level of security of the mechanism, of its complexity of implementation, of its consumption of resources, and/or of its level of dependency in relation to the integrated access device IAD. This choice can, by way of example, rely on the table presented previously.

According to diverse embodiments, during the implementation of these mechanisms, ACS auto-configuration servers are then deployed, making it possible to manage the communication boxes 5 and the initialization of the various mechanisms.

Figure 10:
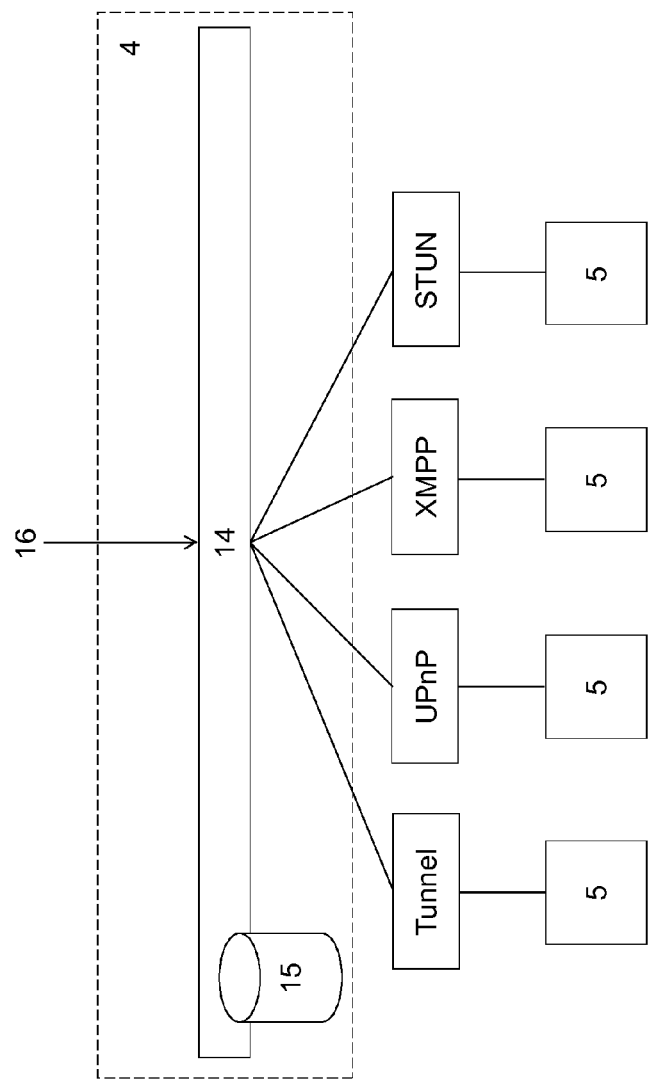
FIG. 10 is a figure illustrating a manager of actions according to one embodiment.

With reference to FIG. 10, an abstraction layer is moreover produced, via an actions manager 14, integrated at the level of the central data platform 4, affording a unified interface, that is to say one which is independent of the type of mechanism implemented and therefore of the protocol employed by this mechanism. The abstraction layer is, by way of example, produced with the aid of a method making it possible to format the data received/recorded by this layer according to a pivot format.

Advantageously, the manager 14 is configured to manage (e.g.: receive, transmit, place on standby) the actions destined for the various items of equipment 1. In FIG. 10, each communication box 5 uses a single mechanism of "tunnel via proxy", "UPnP", "XMPP", or "STUN" type, selected during their deployment and in accordance with the operational constraints. Furthermore, for each communication box 5, the selected mechanism is stored in the central data platform 4, via a database 15 associated with the actions manager 14.

Advantageously, on receipt of an action request 16 (e.g.: for an action pushed by an action consumer) destined for an item of equipment 1 connected to a communication box 5, the action manager 14 is configured to:
    store the action received in the database 15, and thus
        allow temporary placement on standby, for the time that the communication box 5 receives the action request 16. Placement on standby is particularly advantageous when the communication box 5 is temporarily unavailable, for example during a loss of connection with the central data platform 4;
        make it possible to process the action request 16, for example: identify the targeted item of equipment (identifier, address), identify the communication box 5 to which it is connected, identify the communication mechanism to be employed with said communication box 5 to transmit the action request 16. These various identifications are for example carried out by comparing the identifier of the item of equipment with a set of information prerecorded in the database 15;
    trigger the action on the item of equipment 1 by transmitting the action request 16 to its communication box 5, via an appropriate communication mechanism, identified in the database 15.

Moreover, as presented previously, the mechanisms based on the XMPP and STUN protocols are of "wakeup" type: the communication box 5 is forewarned that it must or should contact the central data platform 4 through an upgoing flow so as to retrieve in return the downgoing data flow. In order to support this mechanism, two components are then produced:
    a Wakeup Agent produced on the communication box 5 by putting in place a so-called "middleware" layer. Advantageously, the production of such a layer allows any application of the communication box 5 to subscribe to a wakeup service, allowing it to be woken up by a central application;
    a Wakeup Server via the production of a middleware layer on the central data platform 4, allowing any action "consumer" service (integrated or not on the central data platform 4) to wake up an application of the communication box 5.

Figure 11:
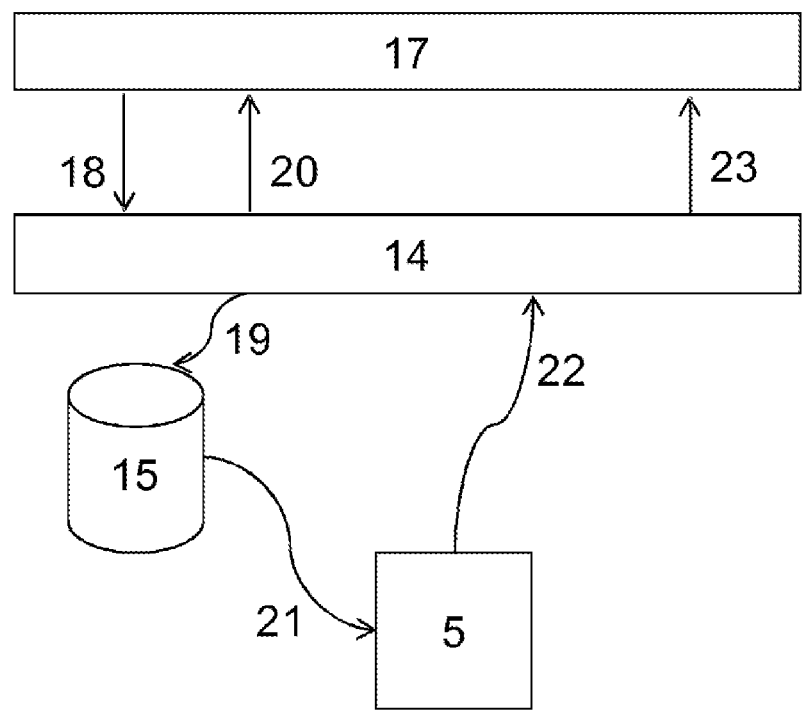
FIG. 11 illustrates a flow of data relating to an action consumer according to one embodiment.

FIG. 11 illustrates the functional flow of data relating to an action consumer 17, such as a provider 7 of user services:
    the action consumer 17 pushes (flow 18) an action request 16 to the actions manager 14 of the central data platform 4. This action request 16 includes information on the type of action to be performed and the item of equipment 1 targeted by this action (e.g.: identifier of the item of equipment, description of the action). This action request 16 may optionally be accompanied by a validity limit date and an address, for example an address of so-called URL "uniform resource locator" type, to notify reception and/or processing of the action request 16 by the communication box 5;
    the actions manager 14 stores (flow 19) this request in a queue in the database 15 and acknowledges (flow 20) the action request 16 sent so as to notify the action consumer 17 that the request has indeed been taken into account;
    on the basis of the identification of the targeted item of equipment 1, the actions manager 14 identifies the communication box 5 and its corresponding access mechanism, and then transmits the action request 16 to the communication box 5. The transmission of the action request 16 is dependent on the type of communication mechanism, two situations possibly arising
        if the communication mechanism is of bidirectional type (of "tunnel via proxy" or UPnP type):
            the actions manager 14 contacts the communication box 5 via the public address provided by the tunnel, or by the integrated access device IAD in the case of a UPnP mechanism;
            if, according to case, the tunnel is open or the UPnP configuration has been performed, the actions manager 14 dispatches (flow 21) a request to the communication box 5 to provide it with the action request 16. Otherwise, the actions manager 14 waits for the re-establishment of the tunnel or the UPnP reconfiguration and then dispatches the action request 16, while optionally managing the validity limit dates of the action request 16;
        if the mechanism is of "wakeup" type (STUN or XMPP)
            the actions manager 14 contacts the wakeup server (middleware layer) of the central data platform 4;
            this wakeup server then attempts to wake up communication box 5 through a low-level protocol (STUN- or XMPP-like according to case). Advantageously, the content of the wakeup message destined for the communication box 5 is limited, and may be restricted to the type of wakeup, for example: a wakeup for action on the item of equipment 1 or a wakeup for remote handling of the item of equipment 1. Furthermore, this message ideally pertains to an in non-connected mode protocol, for example to the "user datagram protocol" termed UDP. The wakeup server moreover manages retransmission functionalities, since the communication box 5 is not necessarily accessible at the moment the action is posted;
            once the communication box 5 is accessible, the wakeup message reaches the wakeup agent of the latter, which is then responsible for analyzing the type of wakeup and for initiating the connection to the central data platform 4 and to the correct application so as to retrieve the actions on standby;
            the central data platform 4 through the intermediary of its actions manager 14 then provides (flow 21) the action requests on standby (including said action request 16) to the communication box 5, while optionally managing the validity limit date of each of the requests;
    the communication box 5 then executes or transmits the action request 16 to the items of equipment 1 to which it is connected, and returns (flow 22) a report to the actions manager 14;

the actions manager 14 then notifies (flow 23) the actions consumer 17 of the correct execution of the action associated with its initial request (if specified during the initial request).

Advantageously, the functional flow described hereinabove is unified, that is to say includes the same steps, whatever mechanism is considered. The manner of operation of said implemented mechanisms is now described for the following typical cases: remote handling of an item of equipment 1, dispatching of an action to an item of equipment 1, uploading of a measurement of the sensor of an item of equipment 1 destined for the central data platform 4.

Figure 12:
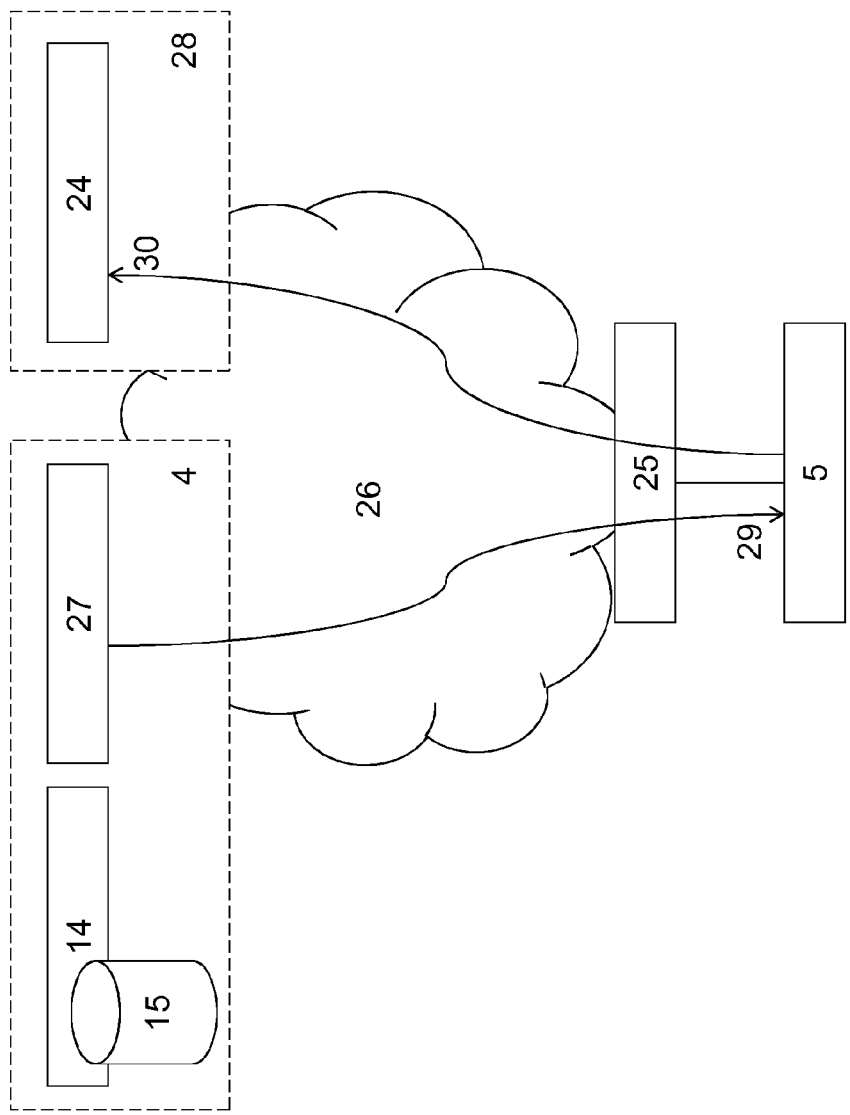
FIG. 12 illustrates the establishment of a tunnel, for a mechanism of communication between a communication box and a proxy according to one embodiment.

FIG. 12 illustrates the main flows of a communication mechanism, in order to implement a tunnel between the communication box 5 and a proxy server 24. In this figure, a communication box 5 is interfaced with an integrated access device IAD 25, via first a communication port, the communication box 5 being addressable only via a private address located behind the integrated access device IAD 25. The integrated access device IAD 25 possesses, moreover, a second communication port, allowing it to be addressable from an external network 26, for example an Internet network, via a public address. A central data platform 4 includes an actions manager 14 associated with a database 15, as well as an ACS auto-configuration server 27 such as described in the TR-069 specification. Moreover, for extensibility reasons, the proxy server 24 is deployed in an agent platform 28, able to exchange data with the central data platform 4. Advantageously, each communication box 5 being connected permanently with a proxy server 24, such an architecture makes it possible for one and the same proxy server 24 to manage a plurality of communication boxes 5 in a specific agent platform 28. Each agent platform 28 uses for its part a determined number of TCP connections with the central data platform 4, this number being independent of the number of communication boxes 5 to which it is connected. Accordingly, it is optionally possible to use multiplexing techniques. Advantageously, such an architecture allows the proxy servers 24 to be seen by the central data platform 4 as virtual instances of the communication boxes 5, but deployed on a public network (e.g.: the Internet). Such a configuration is particularly advantageous, since it makes it possible to circumvent the problems relating to the addressing of the communication boxes 5 in a private network. Moreover, as a function of the number of communication boxes 5, additional agent platforms 28 can if desired in this embodiment be added, thus participating in the extensibility of this architecture. The ACS auto-configuration server 27 disposed in the central data platform 4 makes it possible to inform any communication box 5, during its initialization, of the proxy server 24 to which it is attached. The establishment of the tunnel between the communication box 5 and the proxy server 24 is now described. The establishment of this tunnel occurs at each initialization of the communication box 5 and includes the following steps:

during its initialization, the communication box 5 declares itself to the central data platform 4 via the ACS auto-configuration server 27 according to the TR-069 management protocol;

the communication box 5 is then taken into account by the central data platform 4, and the latter chooses a proxy server 24 with a view to establishing a tunnel with the communication box 5, and associates it with the communication box 5. By way of example, the proxy server 24 is chosen by the central data platform 4, as a function of a geographical proximity and of an availability;

this association is transmitted to the ACS auto-configuration server 27;

and then via a "SetParameterValues" message, the structure of which is defined in the TR-069 protocol, the ACS auto-configuration server 27 activates in the communication box 5, the use of the tunnel by providing it with (flow 29 of the figure) the address of the proxy server 24;

the communication box 5 then establishes (flow 30 of the figure) a TCP connection with the proxy server 24, and dispatches a (non-standard) "BIND" message to indicate its identification to it. Advantageously, the "BIND" message includes the identifier of the communication box 5, as well as the parameters of the TCP connection (e.g.: address and remote port, socket). The reception of this message by the proxy server 24 will therefore allow the latter to manage the virtual instance of the communication box 5, preserving for this instance the identifier of the communication box 5, as well as the parameters of the TCP connection;

this TCP connection is thereafter kept open permanently by the communication box 5.

Figure 13:
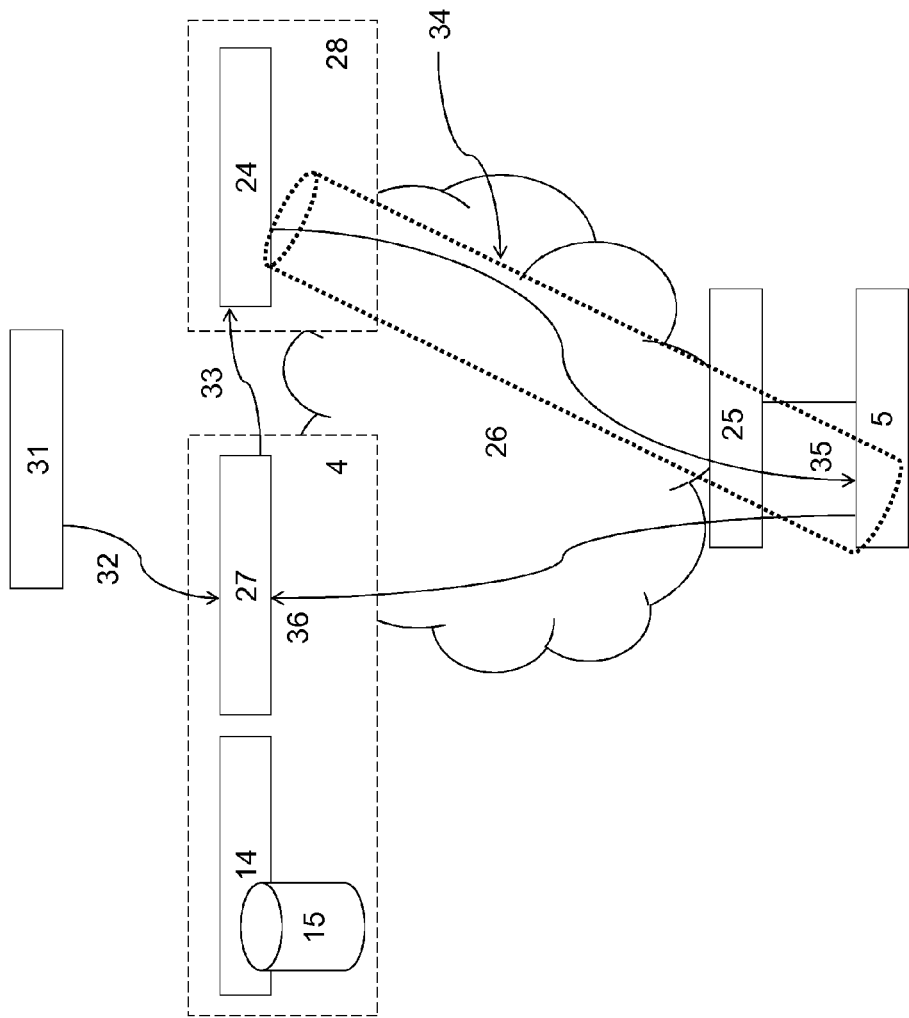
FIG. 13 illustrates the remote handling of the communication box for the mechanism of communication with a proxy according to one embodiment.

FIG. 13 thereafter illustrates for the previous architecture, the main data flows allowing remote handling of the communication box 5 and/or items of equipment 1:

an external player 31, such as a provider 7 of user services, dispatches (flow 32) a handling request, for a communication box 5 or an item of equipment 1, to the ACS auto-configuration server 27;

the ACS auto-configuration server 27 then dispatches (flow 33) a Connection Request message, in accordance with the TR-069 specification, to the proxy server 24, while specifying in this message an identifier relating to the end recipient of the handling, for example relating to a targeted communication box 5 (or item of equipment 1);

by virtue of the identifier of the communication box 5, the proxy server 24 then selects the virtual instance of the communication box 5, and therefore the corresponding tunnel 34;

the proxy server 24 then transmits via the corresponding tunnel 34 the Connection Request to the communication box 5 (flow 35);

the communication box 5 then processes the request and sends (flow 36) in return an "Inform request" message in accordance with the TR-069 specification, destined for the ACS auto-configuration server 27, so as to notify it of the processing of the request;

the handling of the communication box 5 (or of the item of equipment 1), thereafter follows the TR-069 protocol, like any type of network topology with a CPE (here the communication box 5).

Figure 14:
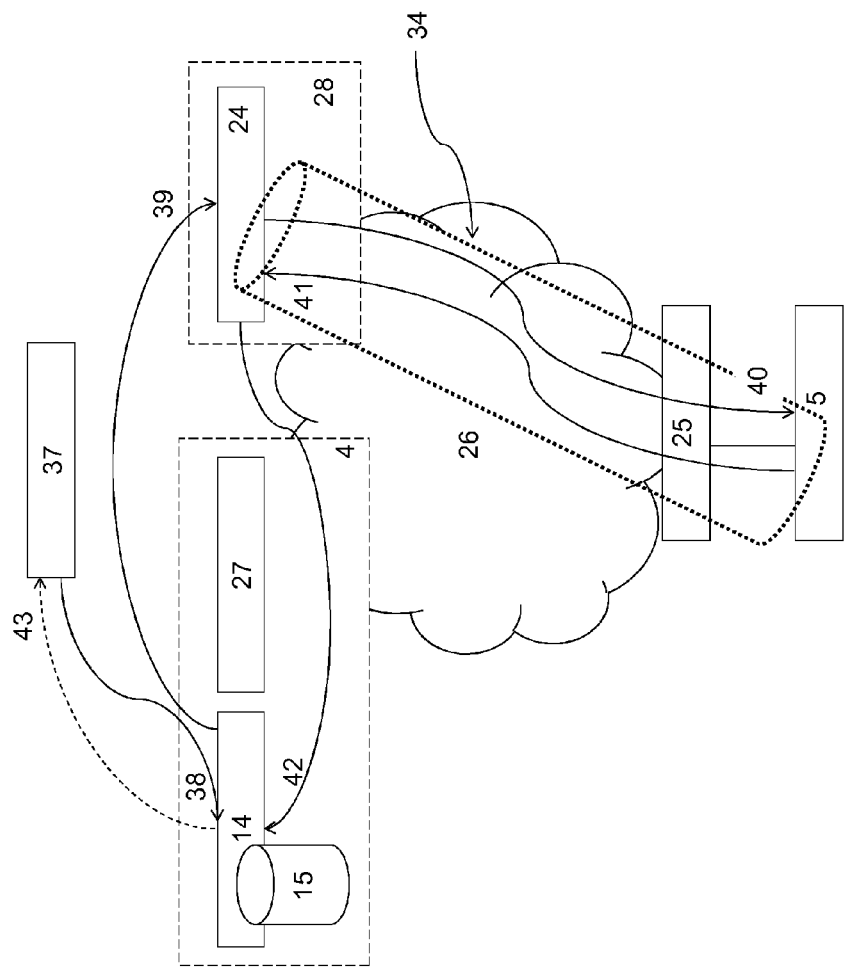
FIG. 14 illustrates the transmission of an action request to an actuator associated with an item of equipment for the mechanism of communication with a proxy according to one embodiment.

FIG. 14 illustrates, for the same architecture, the main data flows making it possible to transmit an action request 16 to an actuator associated with an item of equipment 1:

an external player 37 such as an action consumer dispatches (flow 38) an action request 16 to the actions manager 14 of the central data platform 4;

the actions manager 14 then stores said action request 16 in the database 15, and then dispatches the action request 16 to the proxy server 24. Accordingly, the actions manager 14 opens a TCP connection and is configured to dispatch (flow 39) two requests to the proxy server 24:

a first request, which is a (non-standard) connection request "CONNECT", including the identification of the targeted communication box 5. Advantageously, the "CONNECT" message makes it possible to specify to the proxy server 24 that the following requests, namely the action requests, must or should be addressed to the communication box 5;

a second request corresponding to the action request 16, according to a syntax identical to the case of a communication box 5 directly visible of the Internet, for example an http(s) syntax;

advantageously, by virtue of the "CONNECT" connection request message (first request), the proxy server 24 selects the virtual instance of the targeted communication box 5 and the corresponding tunnel 34. Advantageously, this produces a temporary association within the proxy server 24, between the connection of the actions manager 14 to this server and the tunnel 34 of the communication box 5;

the proxy server 24 then acknowledges, to the actions manager 14, correct receipt of the "CONNECT" connection request message. As long as the actions manager 14 does not receive this acknowledgment, for example when the tunnel 34 is not established, the actions manager 14 is configured to periodically re-send this message or wait for the re-establishment of the tunnel 34;

when the acknowledgment of the "CONNECT" message is received by the action manager 14, the latter then transmits the second request, that is to say the action request 16 to the proxy server 24;

the proxy server 24 then dispatches (flow 40) through the tunnel 34 the action request 16 such as received to the targeted communication box 5;

the communication box 5 then executes the requested action or else transmits it to the item of equipment 1 concerned for execution, and thereafter returns (flow 41) a report to the proxy server 24 via the tunnel 34;

the proxy server 24 then transmits (flow 42) the report such as received to the actions manager 14;

if requested, the actions manager 14 then notifies (flow 43) the external player 37 of the correct execution of his initial action request by the communication box 5 or the item of equipment 1 concerned.

Figure 15:
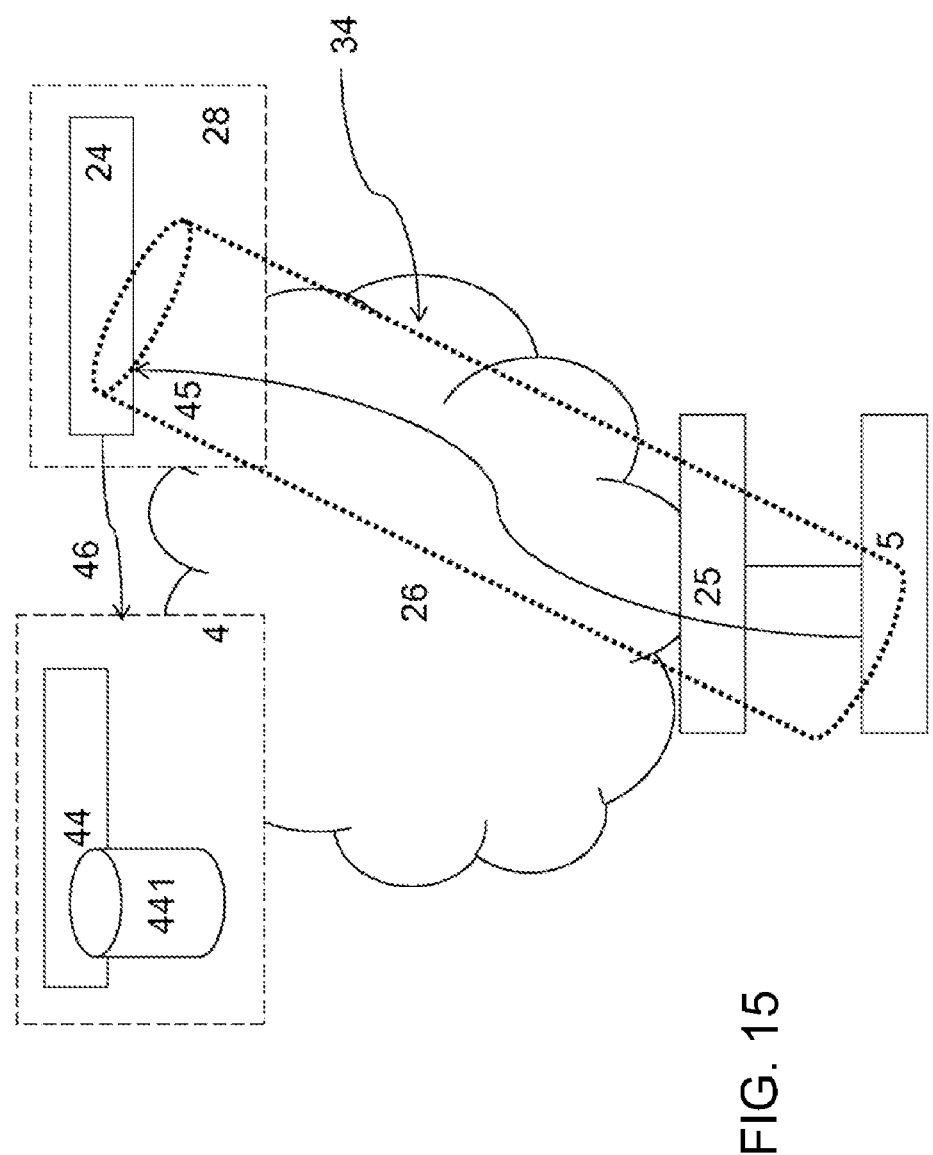
FIG. 15 illustrates the uploading of a measurement of a sensor associated with an item of equipment for the mechanism of communication with a proxy according to one embodiment.

FIG. 15 illustrates, still for the same mechanism, the main data flows making it possible to upload a measurement of a sensor associated with an item of equipment 1. In this figure, the central data platform 4 includes, furthermore, a measurements manager 44 associated with a database 441, making it possible to manage (store and/or make available) the data associated with the sensors of the various items of equipment 1. The process of uploading a measurement to the central data platform 4 from the sensor of an item of equipment 1 connected to a communication box 5 is as follows:

the communication box 5 retrieves the measurement arising from said sensor and transmitted by the item of equipment 1;

the communication box 5 then dispatches (flow 45) to the proxy server 24, through the previously established tunnel 34, the measurement through a message indicating that the target is the measurements manager 44, for example by using a message of the "GET http(s)" type;

the proxy server 24 then initiates a TCP connection to the measurements manager 44 and transmits (flow 46) the measurement.

Figure 16:
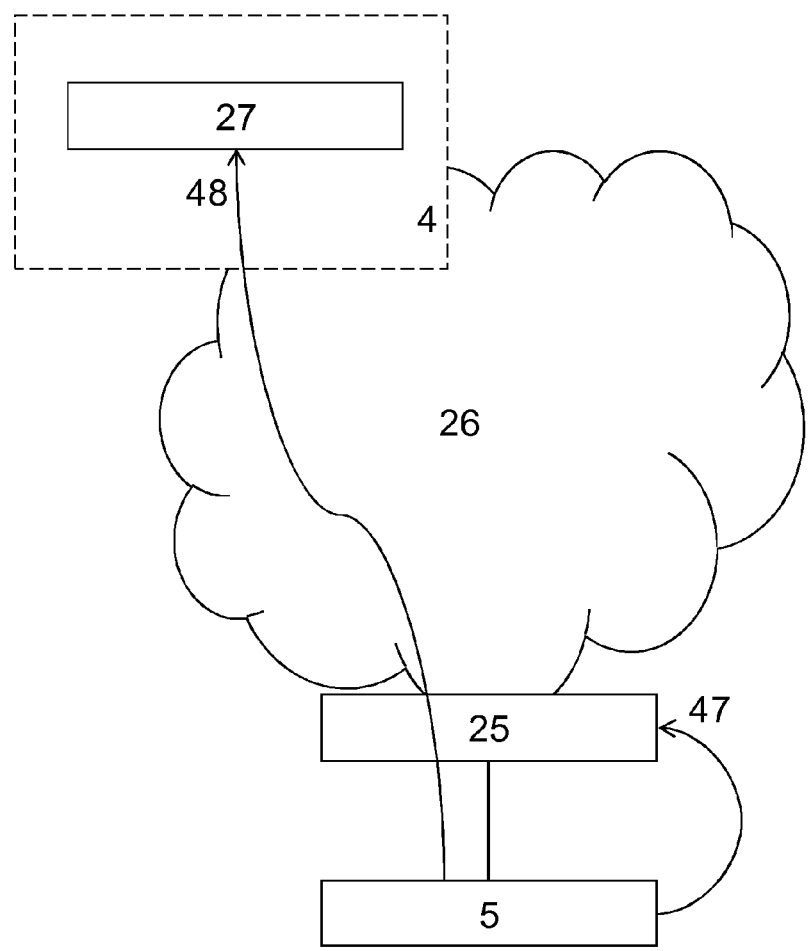
FIG. 16 illustrates the establishment of a connection between a central platform and a communication box for a communication mechanism implementing the UPnP protocol according to one embodiment.

FIG. 16 illustrates the main flows implemented for the establishment of a connection between the central data platform 4, and a communication box 5, for a communication mechanism implementing the UPnP protocol. Just as previously:

the communication box 5 is interfaced with an integrated access device IAD 25, via first a communication port, the communication box 5 being addressable only via a private address;

the integrated access device IAD 25 possesses a second communication port, allowing it to be addressable from an external network 26, for example an Internet network, via a public address;

the central data platform 4 includes an actions manager 14 associated with a database 15 (which are not represented in this figure), as well as an ACS auto-configuration server 27 such as described in the TR-069 specification.

The following process is executed at each initialization of the communication box 5:

during its initialization, the communication box 5 declares itself to the central data platform 4 through the ACS auto-configuration server 27 via the TR-069 management protocol;

the communication box 5 is then taken into account by the central data platform 4, and the latter activates in the communication box 5 the use of the UPnP protocol;

the communication box 5 then sends UPnP requests to integrated access device IAD 25, so as to open a public TCP communication port, thus allowing the activation (flow 47) of the NAT network address translation function;

the communication box 5 then transmits (flow 48) to the ACS auto-configuration server 27, via the TR-069 protocol, the public TCP port open on the integrated access device IAD 25 corresponding to the address translation NAT to the communication box 5.

Figure 17:
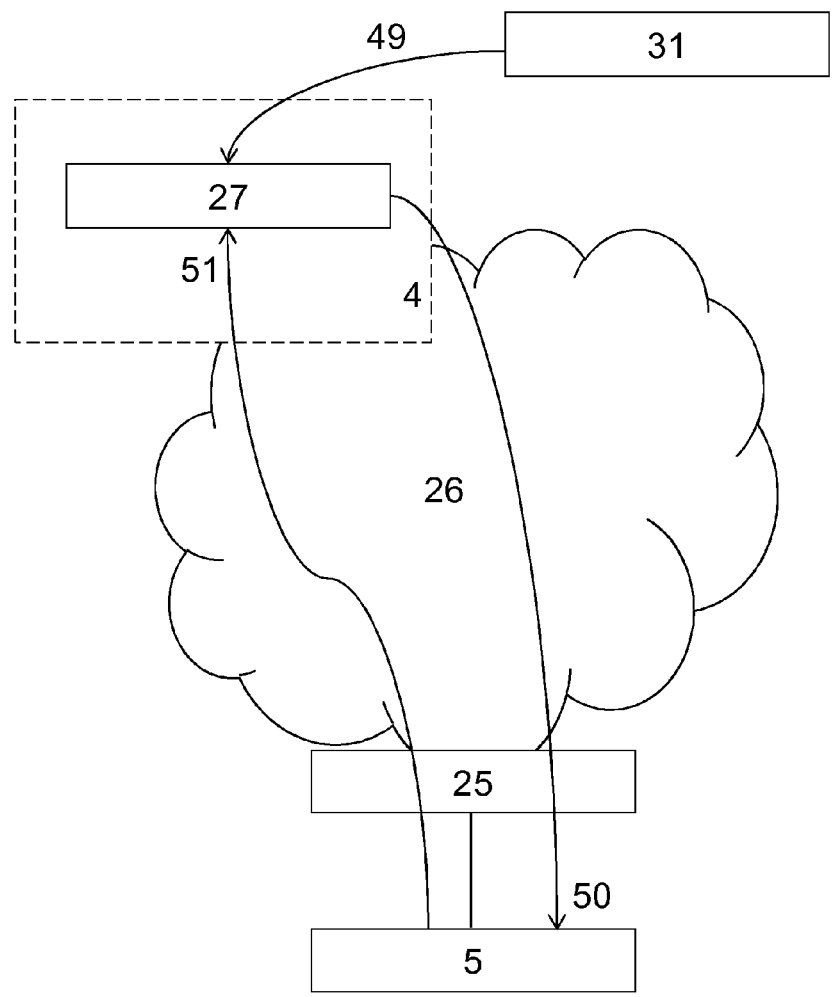
FIG. 17 illustrates the remote handling of the communication box for the communication mechanism implementing the UPnP protocol according to one embodiment.

FIG. 17 thereafter illustrates for the previous mechanism, the main data flows, allowing remote handling of the communication box 5 and/or of the items of equipment 1:

firstly an external player 31 such as a provider 7 of user services dispatches (flow 49) a handling request to the ACS auto-configuration server 27;

the ACS auto-configuration server 27 then dispatches (flow 50) a "Connection Request" message, in accordance with the TR-069 specification, to the communication box 5. Accordingly, it dispatches the "Connection Request" message to the public address of the integrated access device IAD 25, on the public TCP port open during the UPnP establishment. The integrated access device IAD 25 then transmits the message to the communication box 5 by applying the NAT network address translation function;

the communication box 5 then processes the order and sends (flow 51) in return an "Inform request" message, in accordance with the TR-069 standard, destined for the ACS auto-configuration server 27 so as to notify it of the processing of the request;

the handling of the communication box 5 (or of the item of equipment 1), then subsequently follows the TR-069 protocol, like any type of network topology with a CPE (here the communication box 5).

Figure 18:
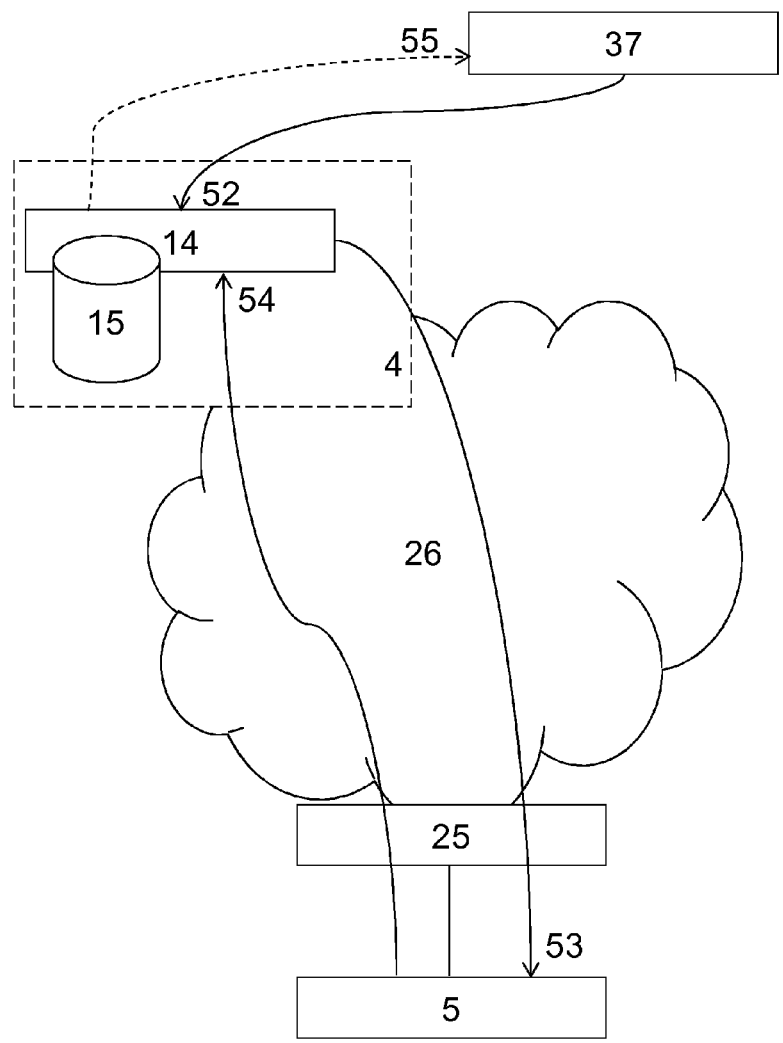
FIG. 18 illustrates the transmission of an action request to an actuator associated with an item of equipment for the communication mechanism implementing the UPnP protocol according to one embodiment.

FIG. 18 illustrates for the same mechanism, the main data flows making it possible to transmit an action request to an actuator associated with an item of equipment 1:

an external player 37 such as an action consumer posts (flow 52) an action request to the actions manager 14 of the central data platform 4;

the actions manager 14 then stores said request in the database 15, and then dispatches (flow 53) the request to the communication box 5. Accordingly, it dispatches the request to the public address of the integrated access device IAD 25 on the public TCP port which is open during the establishment of the UPnP. The integrated access device IAD 25 then transmits the request to the communication box 5, via the use of the NAT network address translation function;

the communication box 5 then executes the requested action, or else transmits it to the item of equipment 1 concerned for execution, and thereafter returns (flow 54) a report to the actions manager 14. As long as the actions manager 14 does not receive this report, for example when the UPnP NAT function is not established, the action manager 14 is configured to periodically re-send this message or wait for the re-establishment of the UPnP NAT network address translation function;

if requested, the actions manager 14 then notifies (flow 55) the external player 37 of the correct execution of his initial action request by the communication box 5 or the item of equipment 1 concerned.

Figure 19:
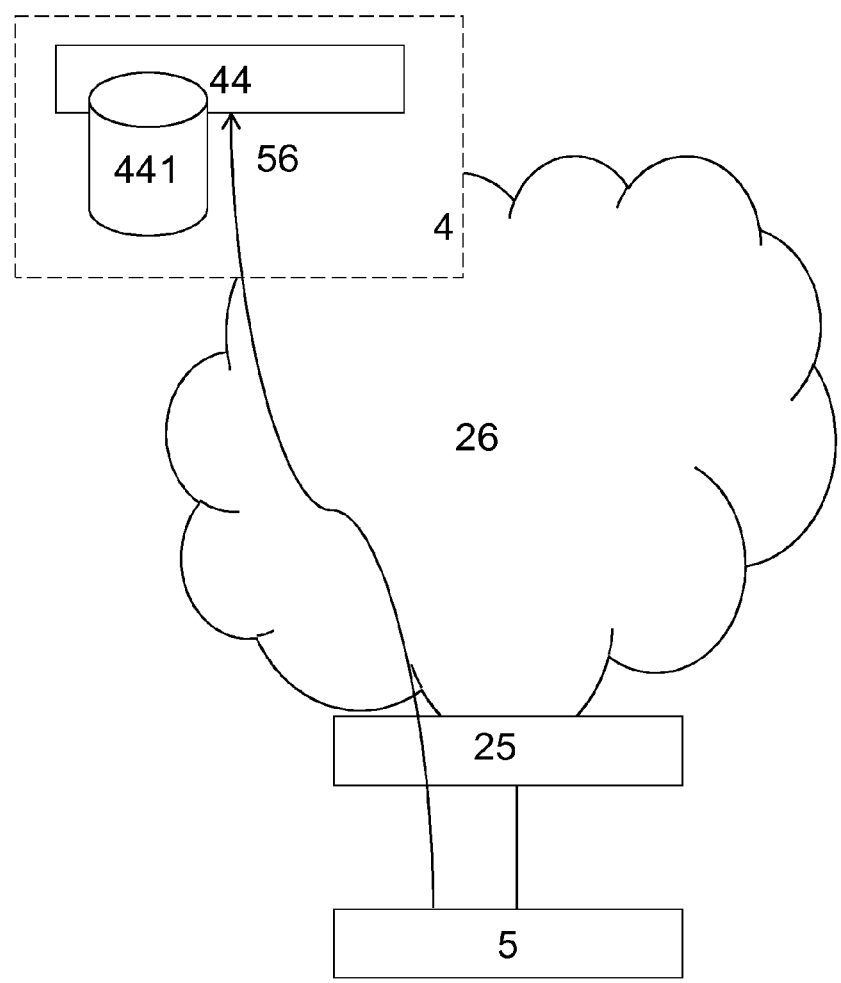
FIG. 19 illustrates the uploading of a measurement of a sensor associated with an item of equipment for the communication mechanism implementing the UPnP protocol according to one embodiment.

FIG. 19 further illustrates for the same mechanism, the main data flows making it possible to upload a measurement of a sensor associated with an item of equipment 1, to the measurements manager 44 of central data platform 4:

the communication box 5 retrieves the measurement arising from said sensor and transmitted by the item of equipment 1;

the communication box 5 thereafter initiates (flow 56) a connection, for example of "http(s)" type to the measurements manager 44 of the central data platform 4;

the communication box 5 finally transmits the measurement through a message indicating that the target is the measurements manager 44, for example by using a message of the "GET http(s)" type.

Figure 20:
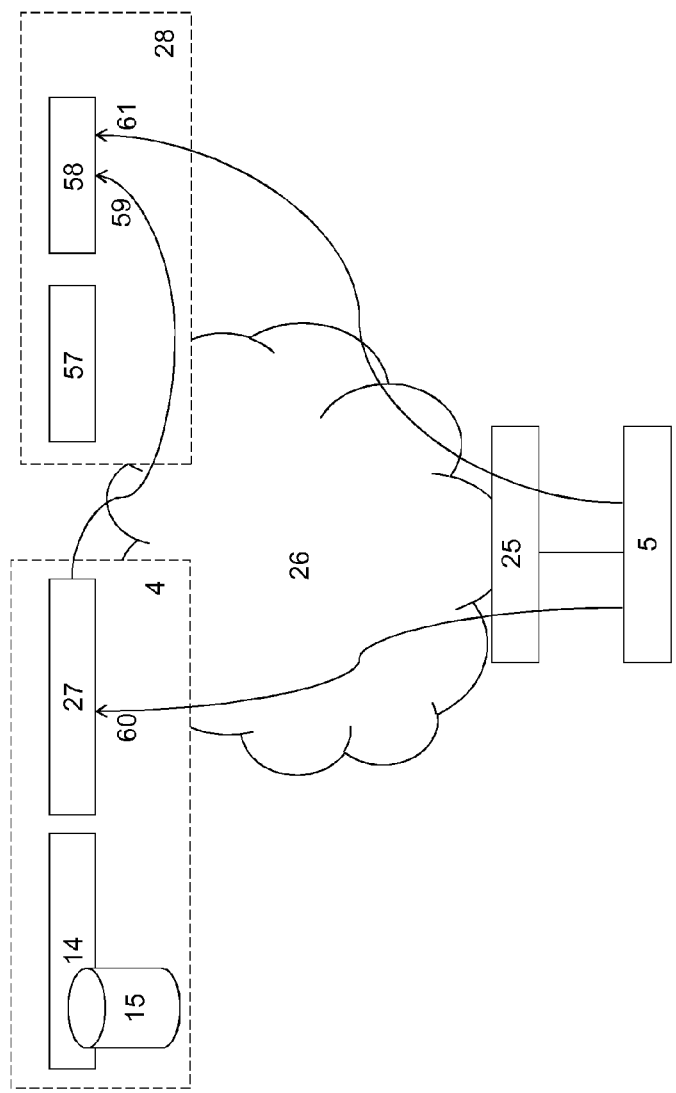
FIG. 20 illustrates the establishment of a connection between a central platform and a communication box for a communication mechanism implementing the XMPP protocol according to one embodiment.

FIG. 20 thereafter illustrates the main flows implemented for the establishment of a connection between the central data platform 4, and a communication box 5, for a communication mechanism implementing the XMPP protocol. Just as previously:

the communication box 5 is interfaced with an integrated access device IAD 25, via first a communication port, the communication box 5 being addressable only via a private address;

the integrated access device IAD 25 possesses a second communication port, allowing it to be addressable from an external network 26, for example an Internet network, via a public address;

the central data platform 4 includes an actions manager 14 associated with a database 15, as well as an ACS auto-configuration server 27 such as described in the TR-069 specification.

Moreover, for extensibility reasons, an http proxy server 57 and an XMPP proxy server 58, both produced in accordance with the TR-069 standard, are deployed in an agent platform 28, the agent platform 28 being able to exchange data with the central data platform 4. Advantageously, each communication box 5 being connected permanently with an XMPP proxy server 58. Advantageously, the production of such an architecture makes it possible for one and the same XMPP proxy server 58 to manage a plurality of communication boxes 5 in a specific agent platform 28. As presented subsequently, the http proxy servers 57 will, for their part, be used during the uploading of measurements or the retrieval of actions via http requests. Each agent platform 28 uses, for its part, a determined number of connections with the central data platform 4, this number of connections being independent of the number of communication boxes 5 to which it is connected. Accordingly, it is optionally possible to use multiplexing techniques. Moreover, as a function of the number of communication boxes 5, it is possible, if desired in this embodiment, to add additional agent platforms 28, as well as XMPP proxy servers 58 and http proxy servers 57, thus participating in the extensibility of this architecture. The ACS auto-configuration server 27 disposed in the central data platform 4, then makes it possible to inform any communication box 5 during its initialization of the XMPP proxy server 58 to which it is attached. Likewise, during the configuration of the communication box 5, during its booting, the ACS auto-configuration server 27 is responsible for informing the communication box 5 of its agent http proxy server 57.

The establishment of an XMPP connection between the communication box 5 and the XMPP proxy server 58 is now described. The establishment of this connection occurs at each initialization of the communication box 5 and includes the following steps:

during its initialization, the communication box 5 declares itself to the central data platform 4 through the ACS auto-configuration server 27 via the TR-069 management protocol;

the communication box 5 is then taken into account by the central data platform 4, and the latter chooses an agent XMPP proxy server 58, for example as a function of a geographical proximity and of an XMPP proxy server 58 availability, and associates it with the communication box 5;

this association is thereafter transmitted to the ACS auto-configuration server 27;

the ACS auto-configuration server 27, then establishes (flow 59) a connection with the XMPP proxy server 58, which will thereafter be kept open by the ACS auto-configuration server 27;

and then via the "SetParameterValues" message of the TR-069 protocol, the ACS auto-configuration server 27 activates in the communication box 5, the use of the XMPP protocol by providing (flow 60) it with the address of the server, as well as the authorized Jabber identifiers. Advantageously, the authorized Jabber identifiers are declared in an identical manner in the XMPP proxy server 58 and the ACS auto-configuration server 27, and allow any XMPP client, for example the communication box 5, to identify itself in the course of the XMPP exchanges;

the communication box 5 then establishes (flow 61 of the figure) an XMPP connection with the XMPP proxy server 58, this connection will thereafter be kept open permanently by the communication box 5.

Figure 21:
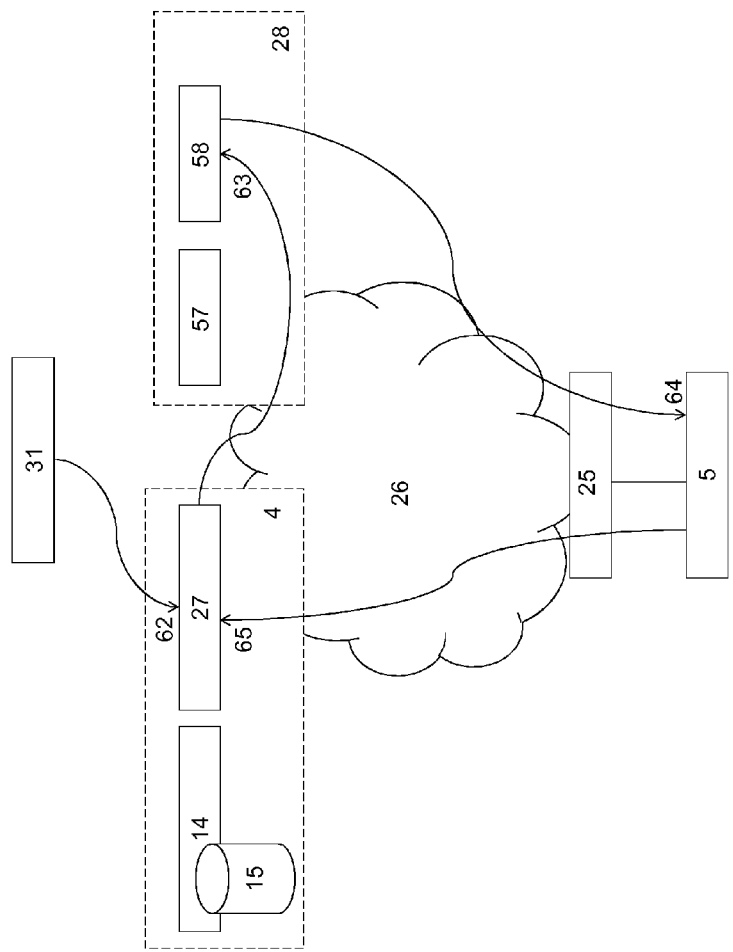
FIG. 21 illustrates the remote handling of the communication box for the communication mechanism implementing the XMPP protocol according to one embodiment.

FIG. 21 illustrates for the architecture and the previous mechanism, the main data flows allowing remote handling of the communication box 5 and/or of the items of equipment 1:

firstly an external player 31 such as a provider 7 of user services dispatches (flow 62) a handling request to the ACS auto-configuration server 27;

the ACS auto-configuration server 27 then dispatches (flow 63), in accordance with annex K.2 of the TR-069 specification, a Connection Request message in XMPP (XMPP "strophe" of "XMPP IQ Stanza" type) to the XMPP proxy server 58. The ACS auto-configuration server 27 specifies in this message, the end recipient of the handling, for example a targeted communication box 5, as well as the source of this message identified by an authorized Jabber identifier. The structure of such a message is in particular detailed in annex K.2.3.1 of the TR-069 specification;

the XMPP proxy server 58 thereafter transmits (flow 64) the message to the communication box 5 via the XMPP protocol;

the communication box 5 then receives the message, and generates a response message in XMPP (XMPP "strophe" of "XMPP IQ Stanza" type) of "result" type in case of correct taking into account of the previous message, or of "error" type otherwise. The structures of these response messages are detailed respectively in annex K.2.3.2 and K.2.3.3 of the TR-069 specification;

the communication box 5 then processes the request and sends (flow 65) in return an "Inform request" message, in accordance with the TR-069 specification, destined for the ACS auto-configuration server 27 so as to notify it of the processing of the request;

the handling of the communication box 5 (or of the item of equipment 1), then subsequently follows the TR-069 protocol, like any type of network topology with a CPE (here the communication box 5).

Figure 22:
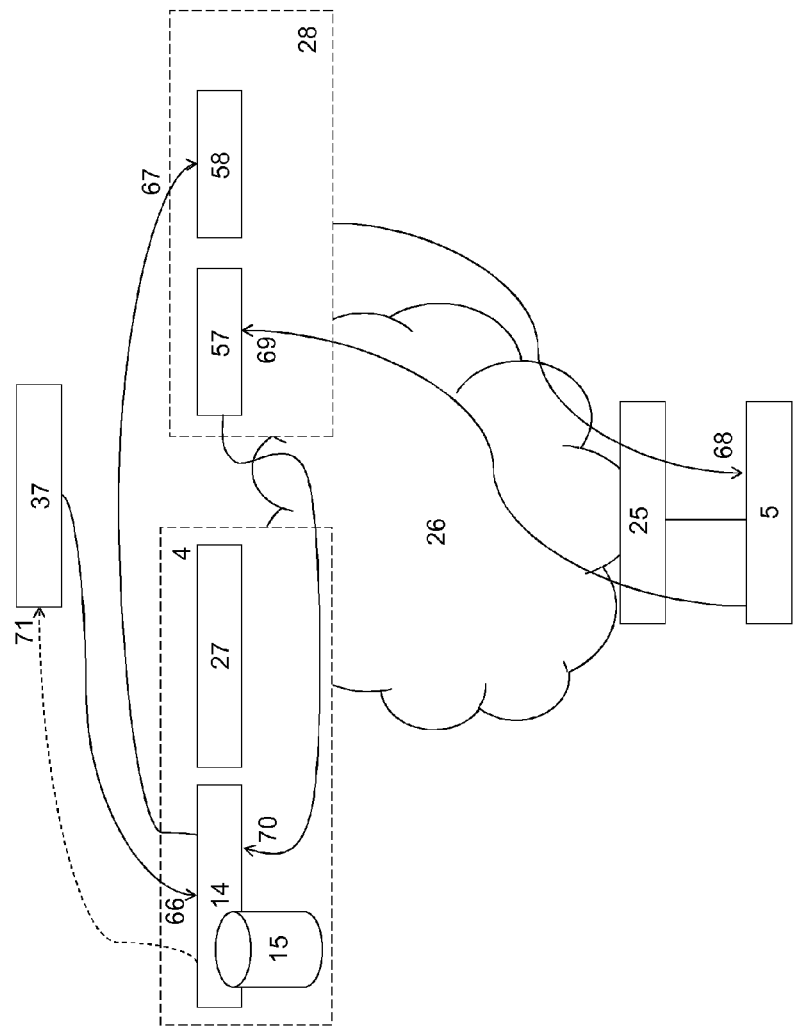
FIG. 22 illustrates the transmission of an action request to an actuator associated with an item of equipment for the communication mechanism implementing the XMPP protocol according to one embodiment.

FIG. 22 illustrates for the same architecture and the same protocol, the main data flows making it possible to transmit an action request 16 to an actuator associated with an item of equipment 1:

an external player 37 such as an action consumer dispatches (flow 66) an action request 16 to the actions manager 14 of the central data platform 4;

the actions manager 14 then stores said action request 16 in the database 15, and then dispatches the action request 16 via an "Action Request" message in XMPP (message of "XMPP IQ Stanza" type) to the XMPP proxy server 58. Advantageously, the "Action Request" message includes as origin an authorized Jabber identifier and as recipient the communication box 5. According to diverse embodiments, the "Action Request" message not being described in the TR-069 specification, it is possible to draw inspiration from the structure of the "Connection Request" message described in annex K.2.3.1 of this specification, in order to implement this message. An exemplary embodiment of the "Action Request" message is given hereinbelow. Specified in particular in this example are: an action request 16 ("actionRequest" fields) of "get" type, a Jabber identifier pertaining to the sender of the action request 16 ("from= . . . " fields), here the actions manager 14, a Jabber identifier for a recipient ("to= . . . " fields) of the action request 16, here the communication box 5, a message identifier ("id" fields) and connection information such as a user name and a password ("username", "password" fields), this information being constituent information of a message of "XMPP IQ Stanza" type ("iq" fields):

```
iq from="[PF-identity]" to="L@D/R" id="cr001" type="get">
  <actionRequest xmlns="urn:bull-org:cwmp:xmppActReq-1-0">
    <username>username</username>
    <password>password</password>
  </actionRequest>
</iq>
``` the XMPP proxy server 58, receives the "Action Request" message, and then acts as a Wakeup Server, by transmitting (flow 68) this message to the communication box 5 via the XMPP protocol. Moreover, the XMPP proxy server 58 is capable of storing said message if the communication box 5 is disconnected, and then re-sends it upon reconnection of the communication box 5;

the communication box 5 then receives the message, and generates a response message in XMPP ("XMPP IQ Stanza" XMPP strophe) of "result" type in case of correct taking into account of the previous message, or of "error" type otherwise. The structures of these response messages are detailed respectively in annex K.2.3.2 and K.2.3.3 of the TR-069 specification;

the communication box 5 thereafter initiates an http(s) connection so as to retrieve the action requests on standby. This connection is established (flow 69) with the http proxy server 57 of the agent platform 28, which itself will interrogate (flow 70) the actions manager 14 with a view to retrieving the action requests, for example via a message of the "GET http" type. Advantageously, the use of the http proxy server 57 in the agent platform 28, then makes it possible to optimize the resources of the central data platform 4, by sparing it from multiple http connections initiated directly from the various communication boxes 5;

the action manager 14 then provides in response the action requests to the communication box 5, via the connection established with the XMPP proxy server 58. The action manager 14 manages, moreover, the expiry of the action requests according to two modes:

according to an asynchronous mode if the communication box 5 is not available, via the XMPP wakeup message transmitted by the http proxy server 57;

according to a synchronous mode, by "real-time" transmission of the actions to the communication box 5 if the latter is available (subject to the temporal validity of the action, dependent for example on a preconfigured temporal threshold);

the communication box 5 then executes the requested action or else transmits it to the item of equipment 1 concerned for execution, and thereafter returns a report to the action manager 14, by way of the http proxy server 57;

if requested, the actions manager 14 then notifies (flow 71) the external player 37 of the correct execution of his initial action request by the communication box 5 or the item of equipment 1 concerned.

Figure 23:
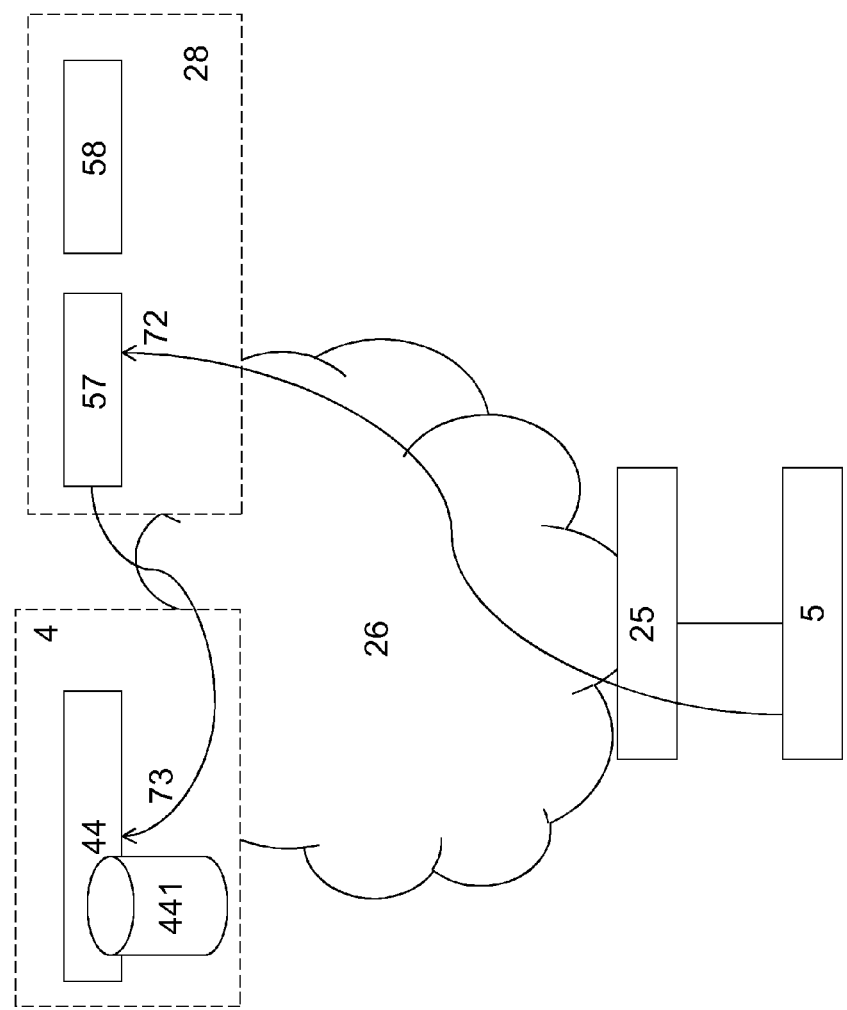
FIG. 23 illustrates the uploading of a measurement of a sensor associated with an item of equipment for the communication mechanism implementing the XMPP protocol according to one embodiment.

FIG. 23 further illustrates for the same architecture, the main data flows making it possible to upload a measurement of a sensor associated with an item of equipment 1. In this figure, the central data platform 4 includes, a measurements manager 44 associated with a database 441, making it possible to manage (store and/or make available) the data associated with the sensors of the various items of equipment 1. The process of uploading a measurement to the central data platform 4 from the sensor of an item of equipment 1 connected to a communication box 5 is as follows:

the communication box 5 retrieves the measurement arising from said sensor and transmitted by the item of equipment 1;

the communication box 5 initiates (flow 72) an http(s) connection to the http proxy server 57 of the agent platform 28;

the http proxy server 57 then initiates an http(s) connection to the measurements manager 44 of the central data platform 4;

the communication box 5 then dispatches (flow 73) the measurement to the http proxy server 57, via the http(s) connection established, through a message indicating that the target is the measurements manager 44, for example by using a message of the "GET http(s)" type.

Figure 24:
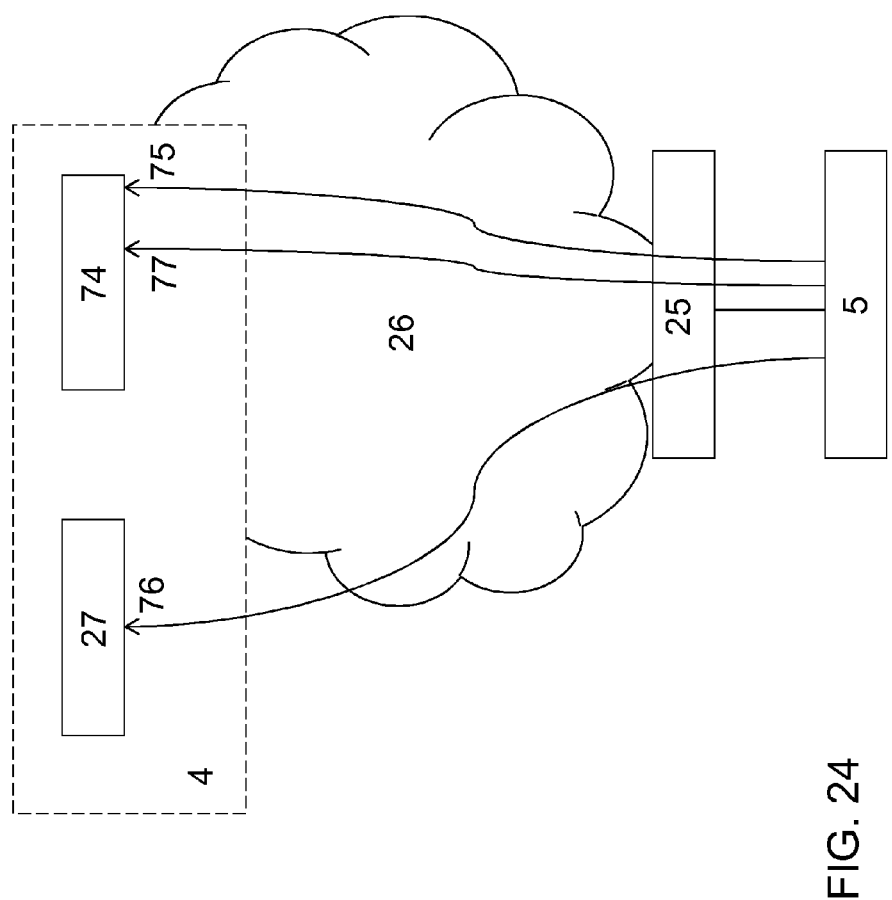
FIG. 24 illustrates the establishment of a connection between a central platform and a communication box for a communication mechanism implementing the STUN protocol according to one embodiment.

FIG. 24 illustrates the main flows implemented for the establishment of a tunnel, for a mechanism of communication between the communication box 5 and the central data platform 4, for a communication mechanism implementing the STUN protocol. Just as previously:

- the communication box 5 is interfaced with an integrated access device IAD 25, via first a communication port, the communication box 5 being addressable only via a private address. This private address is by way of example addressable via a gateway/NAT network address translation function which is a constituent of the integrated access device IAD 25;
- the integrated access device IAD 25 possesses a second communication port, allowing it to be addressable from an external network 26, for example an Internet network, via a public address;
- the central data platform 4 includes an actions manager 14 associated with a database 15 (which are not represented in this figure), as well as an ACS auto-configuration server 27 such as described in the TR-069 specification.

Moreover, the central data platform 4 includes a STUN server 74, in accordance with the TR-111 specification. As presented further on, such a server will make it possible to establish a wakeup "tunnel" between the central data platform 4 and the communication box 5.

The establishment of the connection between the communication box 5 and the central data platform 4 is now described. The establishment of this connection occurs at each initialization of the communication box 5 and includes the following steps:

- during its initialization, the communication box 5 declares itself to the central data platform 4 through the ACS auto-configuration server 27 via the TR-069 management protocol;
- the communication box 5 is then taken into account by the central data platform 4, and the latter activates in the communication box 5 the use of the STUN protocol;
- the communication box 5 then sends (flow 75) the STUN link requests "STUN Binding Requests" destined for the STUN server 74 of the central data platform 4, in accordance with part 2.2 of the TR-111 specification. The responses of the STUN server 74 to these requests then allow the communication box 5 to discover the public address of the integrated access device IAD 25. The communication box 5 then transmits (flow 76) the identified public address of the integrated access device IAD 25 to the ACS auto-configuration server 27 via the TR-069 management protocol. Advantageously, the identification of the public address of the integrated access device IAD 25 allows the communication box 5 to discover the presence of a gateway/NAT function in the integrated access device IAD 25, and to establish through this gateway/function a UDP connection with the STUN server 74;
- in order to keep this connection open, the communication box 5 then subsequently dispatches (flow 77) periodically a STUN link request message of "Binding Request" type. Advantageously, this period is configured in such a way that the integrated access device IAD 25 does not deactivate the NAT function following an inactivity period, and is at one and the same time sufficiently long so as to avoid the saturation in terms of resources of the STUN server 74. Thus, in an embodiment, the communication box 5 performs a learning mechanism, by initially sending "Binding Request" connection request messages with a low period, and then by progressively increasing the period of sending of these messages. A limit period for which the box no longer receives any "Binding Response" connection response from the STUN server 74 is thus determined. On the basis of this state, the period identified as usable by the communication box 5 is the period preceding this limit period.

Figure 25:
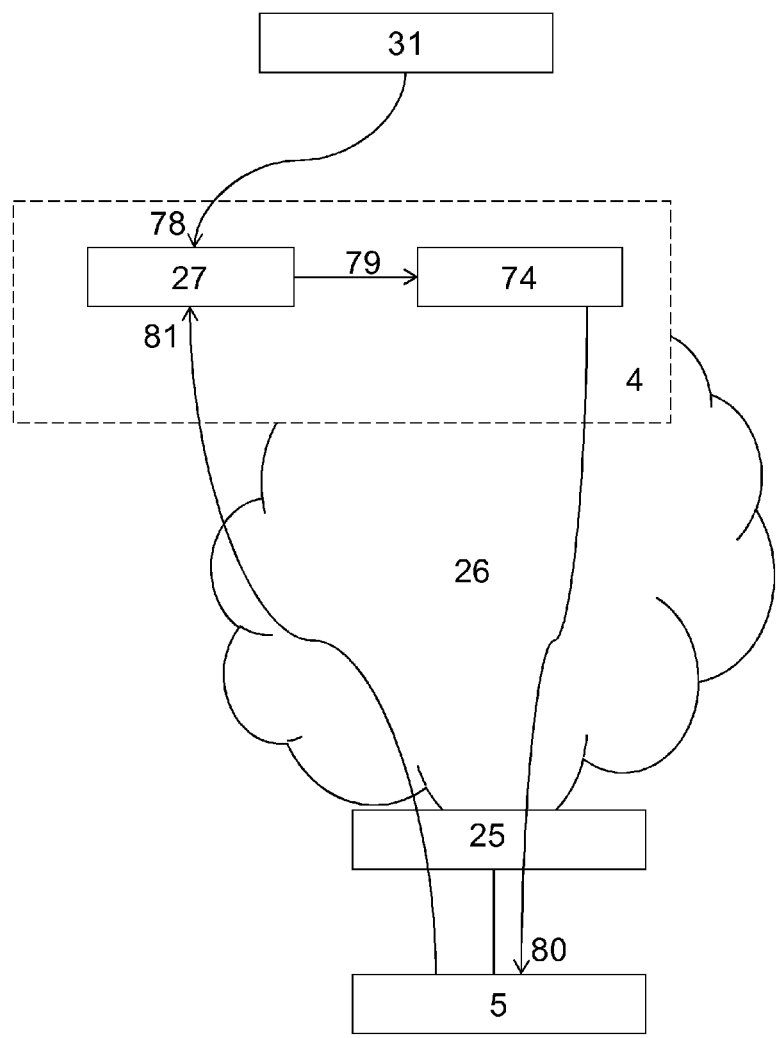
FIG. 25 illustrates the remote handling of the communication box for the communication mechanism implementing the STUN protocol according to one embodiment.

FIG. 25 illustrates for the previous mechanism, the main data flows allowing remote handling of the communication box 5 and/or of the items of equipment 1:

- firstly an external player 31 such as a provider 7 of user services dispatches (flow 78) a handling request to the ACS auto-configuration server 27;
- the ACS auto-configuration server 27 contacts (flow 79) the STUN server 74, in accordance with the TR-111 specification, and asks it to dispatch a Connection Request message according to the UDP protocol, destined for the communication box 5. The production of such a message is described in part 2.2.2.3 of this specification. The STUN server 74 is then the only element authorized by the integrated access device IAD 25 to use the function of NAT network address translation to the communication box 5. Indeed, following the establishment of the connection with the STUN server 74, the integrated access device IAD 25 knows only the address relating to the STUN server 74 as well as the UDP port used with this server;
- the STUN server 74 thereafter dispatches (flow 80) to the communication box 5 a UDP Connection Request message requesting connection to the public UDP port of the integrated access device IAD 25 (used by the function/network address translation NAT gateway to establish the connection with the communication box 5). The integrated access device IAD 25 then transmits this message to the communication box 5 via the function/network address translation NAT gateway;
- the communication box 5 then processes the order and sends in return an "Inform request" message, in accordance with the TR-069 standard, destined for the ACS auto-configuration server 27 (flow 81) so as to notify it of the processing of the request;
- the handling of the communication box 5 (or of the item of equipment 1), then subsequently follows the TR-069 protocol, like any type of network topology with a CPE (here the communication box 5).

Figure 26:
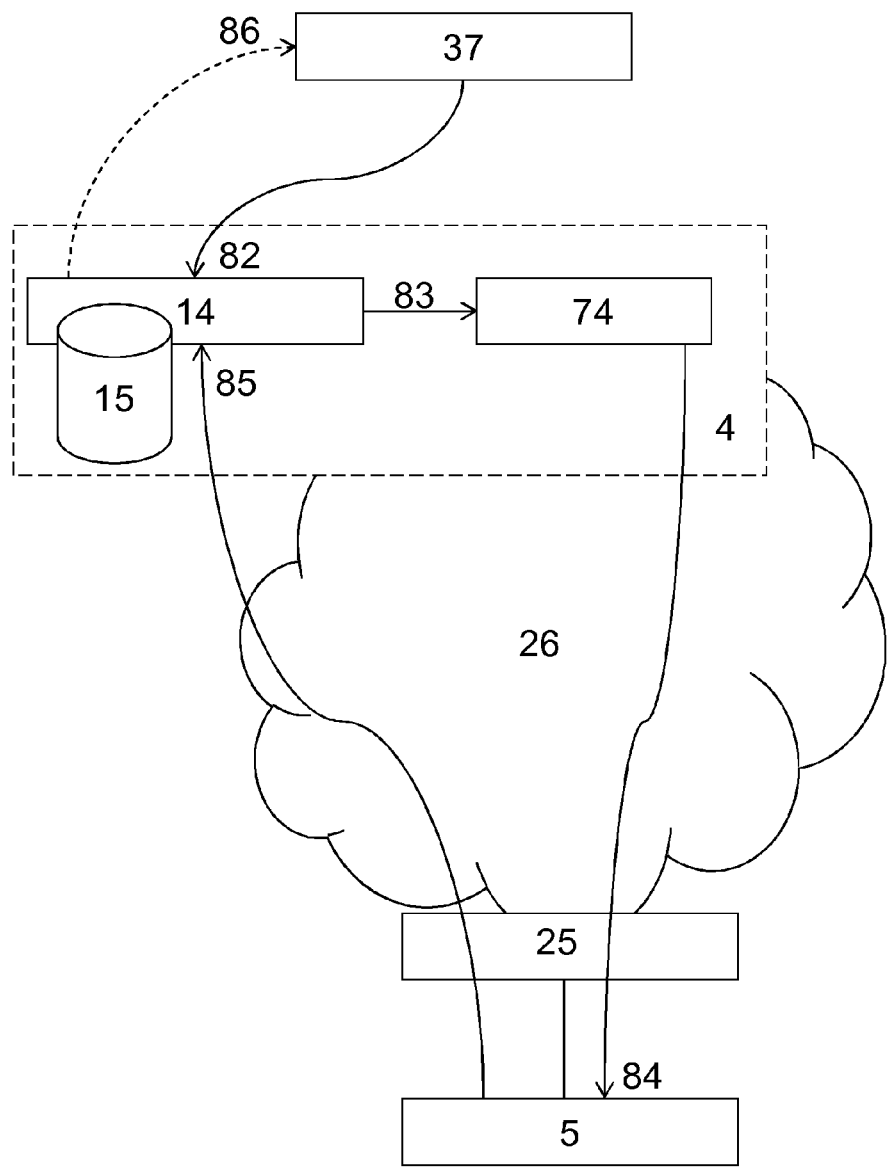
FIG. 26 illustrates the transmission of an action request to an actuator associated with an item of equipment for the communication mechanism implementing the STUN protocol according to one embodiment.

FIG. 26 illustrates for the same mechanism, the main data flows making it possible to transmit an action request 16 to an actuator associated with an item of equipment 1:

- an external player 37 such as an action consumer dispatches (flow 82) an action request 16 to the actions manager 14 of the central data platform 4;
- the actions manager 14 then stores said action request 16 in the database 15, and then contacts the STUN server 74 (flow 83), in accordance with the TR-111 specification, and asks it to dispatch an "Action Request" message in UDP, destined for the communication box 5. According to diverse embodiments, the "Action Request" message not being described in the TR-111 specification, it is possible to draw inspiration from the structure of the "Connection Request" message described in part 2.2.2.3 of this specification, in order to implement this message. An exemplary embodiment of the "Action Request" message is given hereinbelow. The latter specifies a non-empty path associated with the so-called "URI" uniform resource identifier of this message. To construct this message, the highlighted path "ActionRequest" is added, between a field of "hostname" type, here "10.1.1.1:8080", and the arguments of this message that are specified after the "?":
http://10.1.1.1:8080/ActionRequest?ts=1120673700&id= 1234&un=CPE57689&cn=XTGRWIPC6D3IPXS3&sig= 3545F7B5820D76A3DF45A3A509DA8D8C38F13512

The STUN server 74 is then the only element authorized by the integrated access device IAD 25 to use the NAT function to the communication box 5. Indeed, following the establishment of the connection with the STUN server 74, the integrated access device IAD 25 knows only the address relating to the STUN server 74 as well as the UDP port used with this server;

the STUN server 74 thereafter dispatches (flow 84) to the communication box 5 an "Action Request" action request UDP message, to the public UDP port of the integrated access device IAD 25 (used by the function/network address translation NAT gateway to establish the connection with the communication box 5). The integrated access device IAD 25 then transmits this message to the communication box 5 while applying the NAT network address translation function;

the communication box 5 receives the message and sends a message of taking into account (action response) "Action Response", in accordance with the standard TR-111, destined for the STUN server 74. Advantageously, the "Action Response" message, is a UDP message produced in a manner similar to the "Action Request" message, via the use of a non-empty path. An exemplary embodiment for this message is given hereinbelow:
http://10.1.1. 1:8080/ActionRequest?ts=1120673700&id== 1234&a=CPE57689&cn=XTGRWIPC6D3IPXS3&sig= 3545F7B5820D76A3DF45A3A509DA8D8C38F13512

As long as the STUN server 74 does not receive this "Action Response" acknowledgment response, for example when the UDP NAT function is not established, the STUN server 74 is configured to periodically re-send the "Action Request" UDP message or to wait for the re-establishment of the NAT network address translation function;

the communication box 5 thereafter initiates (through the uplink) an http(s) connection to the actions manager 14 (flow 85) so as to retrieve the action requests on standby;

the action manager 14 then provides in response the action requests to the communication box 5, while managing the expiry of the action requests according to two modes:
  according to an asynchronous mode if the communication box 5 is not available, via a UDP wakeup message;
  according to a synchronous mode, by "real-time" transmission of the actions to the communication box 5 if the latter is available (subject to the temporal validity of the action, dependent for example on a preconfigured temporal threshold);

the communication box 5 then executes the requested action or else transmits it to the item of equipment 1 concerned for execution, and thereafter returns a report to the action manager 14;

if requested, the actions manager 14 then notifies (flow 86) the external player 37 of the correct execution of his initial action request 16 by the communication box 5 or the item of equipment 1 concerned.

Moreover, for this architecture, the main data flows making it possible to upload a measurement of a sensor associated with an item of equipment 1, to the measurements manager 44 of central data platform 4, are the same as those of FIG. 19, describing these flows for a mechanism implementing the UPnP:

the communication box 5 retrieves the measurement arising from said sensor and transmitted by the item of equipment 1;

the communication box 5 thereafter initiates (flow 56) a connection, for example of "http(s)" type to the measurements manager 44 of the central data platform 4;

the communication box 5 finally transmits the measurement through a message indicating that the target is the measurements manager 44, for example by using a message of the "GET http(s)" type.

The technical issues and embodiments relating to the communication box 5 are now described. As presented previously, a communication box 5 is deployed in a determined physical environment or place, including one or more items of equipment 1, each of these items of equipment 1 offering user services. Advantageously, each communication box 5 serves:

as protocol gateway between the networks (wired or wireless) of the local items of equipment 1, sensors, actuators and the central data platform 4, the latter accessible via an external network 26 from an integrated access device IAD 25;

in the execution of services, when it is possible to execute them locally rather than at the level of the central data platform 4, for example for reasons of autonomy of the items of equipment 1.

The communication box 5 is moreover shared between several players, for example equipment 1 vendors or providers 7 of user services. Consequently, the communication box 5 hosts common software components which are specific (in particular the user services) to said players, making it possible to manage the communication with the various items of equipment 1 or perform local data processing on the data arising from these items of equipment 1. In this context, one customarily speaks of a "multi-tenant" architecture. The communication box 5 thus implements a middleware services platform. On this platform, the functions specific to each player, by way of example the communication protocol employed with an item of equipment 1 or the specific processing of data associated with an item of equipment 1, are deployed by the players in the form of service oriented software components. A failure or a diversion of a software component associated with a player, must or should not therefore impact and degrade the behaviors of the software components relating to the other players hosted on one and the same platform. By way of example, a memory overflow resulting from an anomaly of coding of a service must or should not propagate in the platform, with the risk of causing the other services to be interrupted ("crash"). Furthermore, in the absence of any standard, the items of equipment 1 connected to the communication box 5 are heterogeneous and based on different communication protocols. Thus, customarily a software component communicating initially with items of equipment 1 according to a protocol, will have to evolve when the item of equipment 1 changes since the associated protocol will also evolve. Furthermore, the change of an item of equipment 1 can also engender a modification of the method of access of the communication box 5 to the data of the item of equipment 1. By way of example, the communication box 5 initially accesses the data of an item of equipment 1 via a method of "pull" type: the item of equipment 1 presents an application programming interface API and the communication box 5 takes the initiative to retrieve the measurements of a sensor associated with this item of equipment 1. A change of this item of equipment 1 then gives rise to the use of an access method of "push" type: the data are pushed on the initiative of the item of equipment 1 to the communication box 5. Consequently, the software component making it possible to communicate with this item of equipment must or should likewise evolve.

Thus, a software services platform based on the Java language and in accordance with the OSGi standard (the acronym standing for "Open Services Gateway initiative"), multi-tenant and integrating a unified application programming interface API for accessing the connected items of equipment 1 or services, is produced in the communication box 5 in order to obviate its drawbacks. Advantageously, such a software platform makes it possible to ensure:
- reliability and high isolation between the software components of different users;
- independence of the application services in relation to the communication protocols for the items of equipment 1 or the data services;
- independence of the application services in relation to the methods of access (e.g.: "pull", "push") to the items of equipment 1 or to the data services.

Such a software platform is produced by the aggregation:
- of an access layer for accessing the connected items of equipment 1, the production of which is described subsequently;
- of a multi-tenant java platform ensuring isolation between the services hosted by the platform. For this type of platform, it is possible to rely on existing related art platforms. By way of example, a Java/OSGi platform is produced, based on a Haas model (the acronym standing for "Hardware as a Service") via application components disposed in a so-called "Kernel" shared container and in separate and leaktight containers termed "Features". Advantageously, such a platform is produced so that the memory space allocated to each container is accessible only if the latter is configured to authorize access thereto. Access of an authorized user to a container, for example when invoking a method, is then performed through an application programming interface API, which limits the user's access to what may be necessary. It is thus difficult to use stack overflow techniques to circumvent control and to illicitly access the memory area of the container from outside. Advantageously, the memory of the container cannot be either accessed or corrupted from outside the container, the "Kernel" shared container and the "Features" leaktight containers executing within a Java virtual machine JVM, and the latter authorizing within it only the execution of isolated containers or communicating only through explicitly presented and controlled methods. The programming code for the components of the "Kernel" is then considered to be reliable (not including any anomalies), while the user services are grouped together in distinct "Features" specific to each supplier. Advantageously, such a structure then guarantees a high isolation between the user services, preventing any failure of a service from having an impact on the others, ensures management of the hardware resources (e.g.: memory occupancy, computation resources) per "Feature" and limits the error propagation of any software component.

Figure 27:
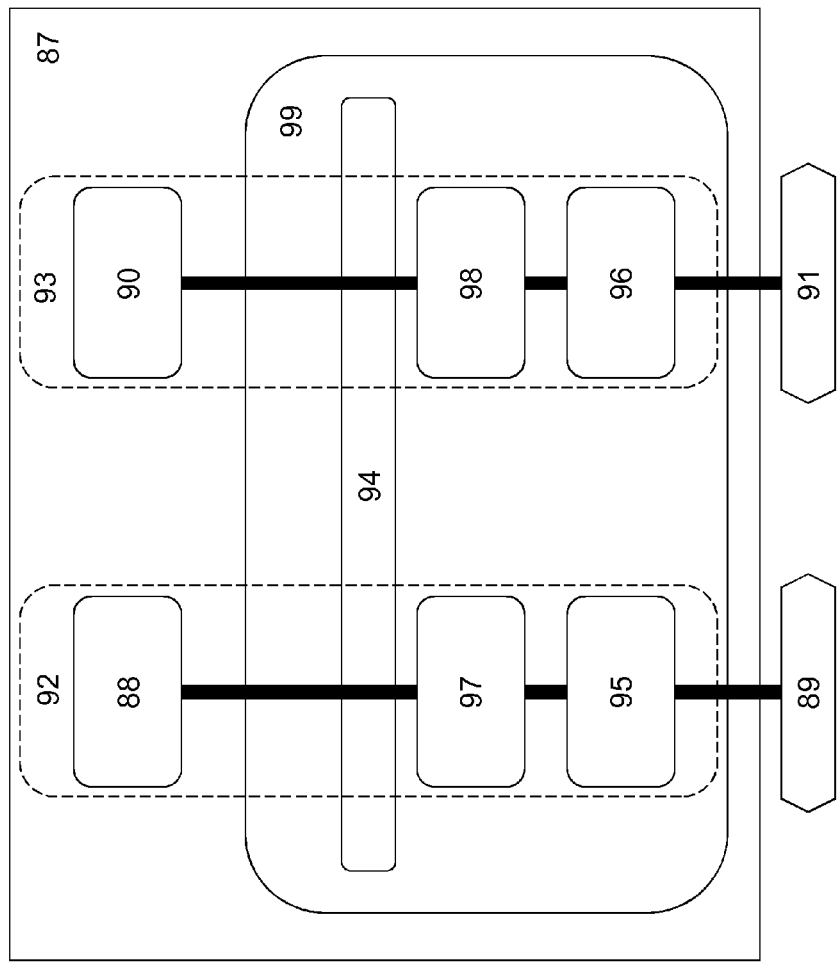
FIG. 27 illustrates the operation of a software platform according to one embodiment.

FIG. 27 illustrates the operating concept of a software platform 87 with the previously described characteristics. The software platform 87 is a platform shared between several users, two in this example, and hosts the set of services of the users each pertaining an item of equipment. In this example, a first service 88 pertains to a first item of equipment 89, and a second service 90 pertains to a second item of equipment 91. The first item of equipment 89 and the second item of equipment 91 are connected in a manner which is external to the software platform 87 of the communication box 5, and use for their exchanges respectively a first and a second protocol. Moreover, in another embodiment, any remote/distant service, accessible via an application programming interface API, can substitute itself for an item of equipment 89, 91. Here, remote/distant service is intended to mean any service making it possible to generalize a data source such as an item of equipment 89, 91 or else any service of so-called SaaS "Software as a Service" type deployed in the "Cloud". For example, the element 91 can be a remote service instead of the second item of equipment, this service calling upon the second protocol. Advantageously, the specific software components, including each user's own services 88, 90, are respectively isolated in leaktight containers 92, 93, customarily referred to by the term "sandbox" or "Feature". A unified application programming interface API 94 then allows access to the items of equipment 89, 91 or to remote services from the application services 88, 90, or more generally to any outside software or hardware element, so-called "eThing", connected to the software platform 87 of the communication box 5. Thus, to ensure at one and the same time the support of elements (e.g.: items of equipment 89, 91 or remote services) managed by a user, and the support of the communication protocols associated with these elements, a protocol adapter relating to the protocol of the element, as well as an element adapter, termed an "eThing" adapter, are deployed between the unified application programming interface API 94 and any "eThing" element, these adapters taking the form of software components, such as OSGi services.

Thus, in the example illustrated, a first and a second protocol adapter 95, 96 is respectively associated with the first and with the second item of equipment 89,91, each of these adapters being interfaced respectively with a first and a second "eThing" adapter 97,98, these adapters implementing the unified application programming interface API 94. Advantageously, the adapters specific to one and the same item of equipment are isolated in one and the same leaktight container ("Feature"). For example, the protocol adapters 95, 96 and the "eThing" element adapters 97, 98 are respectively deployed in the containers 92, 93. However, one and the same protocol adapter may optionally be shared between several users. Advantageously, the unified application programming interface API 94, the protocol adapters 95, 96 and the "eThing" element adapters 97, 98 thus constitute a unified-access structure 99 ("framework"), that is to say an access layer for accessing the connected items of equipment 1, 89, 91.

Figure 28:
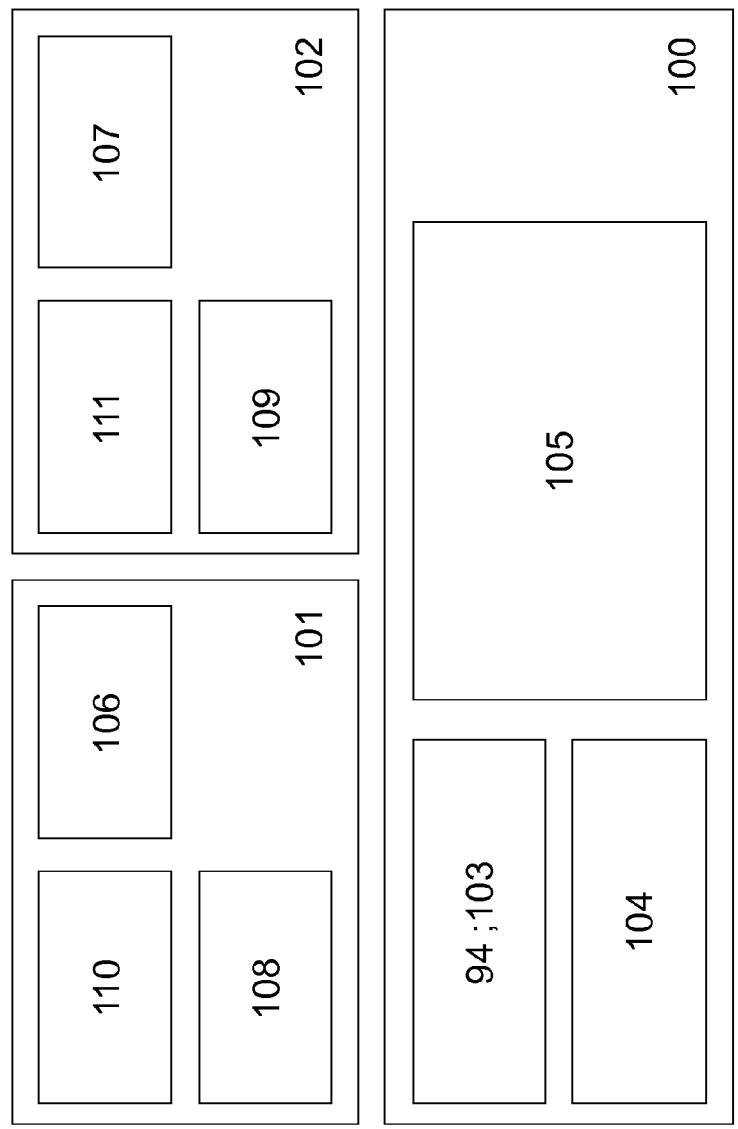
FIG. 28 illustrates an exemplary distribution of the elements of the software platform according to one embodiment.

FIG. 28 illustrates an exemplary distribution of the elements of the previously described software platform 87, combined with a Java/OSGi approach based on a Haas model (the acronym standing for "Hardware as a Service") carried out by application components disposed in a so-called "Kernel" shared container 100, and in separate and leaktight so-called "Features" containers 101, 102. In this example:

the "Kernel" shared container 100, presumed reliable, incorporates

Java interfaces 103, detailed subsequently, which are constituents of the unified application programming interface API 94, and data classes corresponding to the objects exchanged at the level of the application programming interface 94, for example structured (e.g.: binary, boolean) data classes uploaded by the items of equipment 1, 89, 91;

protocol adapters 104 shared by all or most of the users, that is to say shared by various services, for example Zigbee adapters, or serial ports;

user common services 105, for example a rules engine, and a service for publishing data to an interface of REST type (the acronym standing for "Representational State Transfer");

each separate "Features" (software components) container 101, 102 specific to a user, incorporates services 106, 107 specific to a user, for example services for preprocessing on the data of an item of equipment 1, 89, 91;

protocol adapters 108, 109 specific to their item of equipment;

"eThing" element adapters 110, 111 implementing the unified application programming interface API 94.

Figure 29:
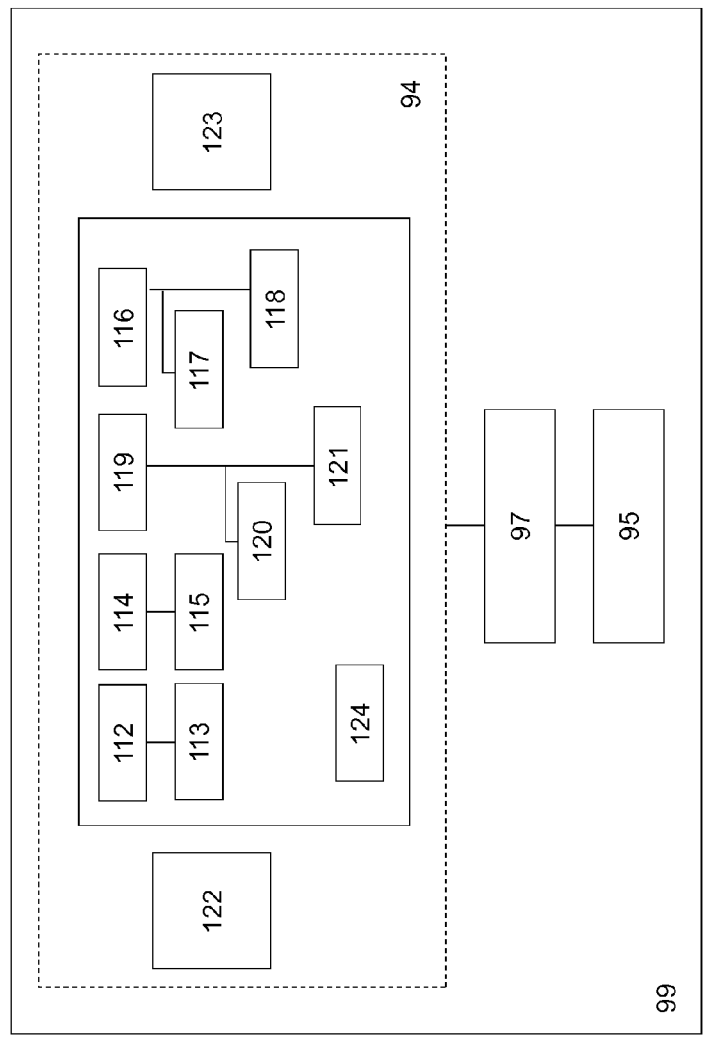
FIG. 29 illustrates the production of the unified-access structure according to one embodiment.

FIG. 29 illustrates the production of the unified-access structure 99 ("framework"), including the unified application programming interface API 94. The latter is interfaced with an adapter of "eThing" elements via an interface referred to subsequently as an "eThing" element interface 112, this interface being an OSGi service. In this example, the adapter of "eThing" elements is the adapter 97 of "eThing" elements of the first item of equipment 89 (not represented). The adapter 97 of "eThing" elements is itself interfaced with the protocol adapter 95. The unified application programming interface API 94, the adapter of "eThing" elements 97 and the protocol adapter 95 are therefore constituents of the unified-access structure 99. In this structure, each item of equipment 89, or more generally any "eThing" connected element, is represented in the unified-access structure 99 by an OSGi service implementing the "eThing" element interface 112, this service including the following attributes: a state, a unique identifier, a name, a vendor, a version, a serial number, a description.

Thus, in the example hereinbelow, an adapter 97 of "eThing" elements implements the "eThing" OSGi interface, is interfaced with a protocol adapter 95 via a "bindProtocolAdapter( )" method, this method being able to associate any protocol adapter 95 with any "eThing" element, and includes as fields: a state "Status", a unique identifier "UID", a name "NAME", a vendor "VENDOR", a version "VERSION", a serial number "SERIAL_NUMBER", a description "DESCRIPTION"

```
package com.bull.everythink.etmf.api.ethings;
import com.bull.everythink.etmf.api.protocoladapters.ProtocolAdapter;
public interface EThing {
    enum Status {
        UNRESOLVED,
        STOPPED,
        STARTED
    }
    String PROPERTY_NAME = "eThing.name";
    String PROPERTY_VENDOR = "eThing.vendor;
    String PROPERTY_VERSION = "eThing.version";
    String PROPERTY_SERIAL_NUMBER = "eThing.serial.number";
    String PROPERTY_DESCRIPTION = "eThing.description";
    String PROPERTY_UID = "eThing.uid";
    Status getStatus( );
    void bindProtocolAdapter(ProtocolAdapter protocolAdapter);
    void unbindProtocolAdapter( );
    void start( );
    void stop( );
    String getUID( );
}
```

The functions of the item of equipment 1, 89, 91 (or of the service) are for their part represented by OSGi services implementing an elements function abstract interface 113 named "eThingFunction" and three base interfaces:

an alarm interface 114 named "Alarm", making it possible to generate the alarms arising from the item of equipment, these alarms being described by a class 115 named "AlarmData";

a control interface 116 "Control", making it possible to control the state of an item of equipment and/or to act on top, and including two functions a binary control function 117 named "BinaryControl", in the case where the state associated with the sensor of an item of equipment is of binary type. The value of this state is then represented by a class named "BinaryData";

a multi-level control function 118 named "MultiLevelControl", in the case where the state of the sensor associated with an item of equipment includes several states (multivalued). The value of this state is then represented by a class named "MultiLevelData";

a sensor interface 119 named "Sensor", making it possible to collect, periodically or otherwise, a value arising from a sensor of an item of equipment 1, 89, 91, according to two functions:

a binary sensor function 120 named "BinarySensor", if the associated sensor is of binary type. The value is then represented by the class named "BinaryData";

a multi-level sensor function 121 named "MultiLevelSensor", if the associated sensor case is multivalued. The value is then represented by the class named "MultiLevelData".

Exemplary embodiments of the "eThingFunction" elements function abstract interface 113, of the "Alarm" base interface and of the "AlarmData" class are given hereinbelow:

```
public interface EThingFunction<D extends Data> {
  String PROPERTY_NAME = "eThing.function.name";
  String PROPERTY_DESCRIPTION = "eThing.function.description";
  String TOPIC_DATA_PUBLISHED = "com/bull/everythink/etmf/ethings/functions/data/PUBLISHED";
  Map<String, ?> getProperties( );
  Class<D> supportedData( );
}
public interface Alarm<A extends AlarmData> extends EThingFunction<A> {
}
public class AlarmData implements Data {
  private long timestamp;
  private Map<String, String> metadata = new HashMap<String, String>( );
  private int type;
  public AlarmData(int type, Map<String, String> metadata) {
    this(type, new Date( ).getTime( ), metadata);
  }
  public AlarmData(int type, long timestamp, Map<String, String> metadata) {
    this.timestamp = timestamp;
    this.type = type;
    if (metadata != null) {
      this.metadata.putAll(metadata);
    }
  }
  public int get Type( ) {
    return type;
  }
  public Map<String, String> getMetadata( ) {
    return metadata;
  }
  public long getTimestamp( ) {
    return timestamp;
  }
}
```

Advantageously, a new item of equipment 1, 89, 91 or added service is supported in the system by the addition of adapter 97 of "eThing" elements, via an "eThingAdapter" class implementing the previously described interfaces.

Thus, for communication with the first item of equipment 89, the adapter 97 of "eThing" elements is connected to the protocol adapter 95, the latter presenting a service with an OSGi interface suitable for the specific communication protocol of this item of equipment 89. Advantageously, the specific interfaces suitable for the communication protocols include two base interfaces named "CommProtocolAdapter" and "ProtocolAdapterFactory".

Each service of the "ProtocolAdapter" interface presents at least the following two properties: type, vendor.

Each type of protocol adapter 95 then defines an OSGi interface which extends the "CommProtocolAdapter" interface. Here, extending an interface (composed of methods, parameters and associated return values), is understood to mean repeating an existing interface at a more generic level of abstraction, and adding new methods of its own to it. Furthermore, with each protocol adapter is associated a Protocol Adapter Factory (PAF) making it possible to create a protocol adapter with appropriate properties. Advantageously, each protocol adapter factory PAF defines an interface which extends the "ProtocolAdapterFactory" interface. The protocol adapter created by the protocol adapter factory PAF is thereafter associated with an "eThing" element adapter. The "eThing" element adapter will thereafter be able optionally to notify the protocol adapter factory PAF that it is no longer using the protocol adapter, thus making it possible to release optional resources.

An exemplary embodiment of protocol adapter 95, extending the "ProtocolAdapter" OSGi class, exhibiting as properties a type "TYPE" and a vendor "VENDOR" is given hereinbelow:

```
package com.bull/everythink.etmf.api.protocoladapters;
public interface ProtocolAdapter {
  String PROPERTY_TYPE = "protocol.adapter.type";
  String PROPERTY_VENDOR = "protocol.adapter.vendor";
}
```

For this example, each protocol adapter is associated with a protocol adapter factory PAF, extending the "ProtocolAdapterFactory" interface and produced in the following manner:

```
package com.bull.everythink.etmf.api.protocoladapters;
import java.util.Dictionary;
public interface ProtocolAdapterFactory {
    ProtocolAdapter createProtocolAdapter(Dictionary<?, ?> properites) throws ProtocolAdapterException;
      void releaseProtocolAdapter(ProtocolAdapter protocolAdapter) throws ProtocolAdapterException;
  }
```

Moreover, the unified-access structure 99 ("framework"), more precisely the application programming interface 94, includes the following two programmatic interfaces:

a publication/subscription interface 122 named "publish/subscribe", allowing, according to an event-based mode the asynchronous reception of events or data arising from an item of equipment 1, 89, 91 or a service, after a step of subscription of the user, to the unified-access structure 99 ("framework") (e.g.: destined for a specific service 88, 90);

the asynchronous publication from the unified-access structure 99 ("framework") (e.g.: on the basis of a specific service 88, 90), of data or of events to an item of equipment 1, 89, 91 or service relating to one or more subscriber users;

a request interface 123 named "request" allowing, according to a synchronous mode, the retrieval, the reading/ the writing of data arising from/destined for an item of equipment 1, 89, 91 or service, to/from the unified-access structure 99 ("framework") (e.g.: to/from a specific service 88, 90).

Advantageously, the request interface 123 named "request" makes it possible to dispatch requests on the items of equipment 1, 89, 91 ("eThing" services) for reading of data (message of "GET" type) or for writing (message of "SET" type on an attribute or invocation of an operation). In one embodiment for creating requests to an element (item of equipment 1, 89, 91 or service), a static method is used, including as arguments the "uid" identifier of the "eThing" element, as well as the name of the "eThingFunction" element function.

A method is thereafter used to:
read the data on an item of equipment ("getData" command):
<D extends Data> D getData(Class<D>rawDataType)
write data to an item of equipment ("sendData" command):
<D extends Data>Request sendData(D data)

The publication/subscription interface 122 named "publish/subscribe", makes it possible for its part:

to produce data on this interface by furnishing an "eThing" equipment identifier:

```
<D extends Data> Publisher publishData(D data, String eThingName, String
eThingVersion, String eThingUid, String eThingFunctionName)
```

Advantageously, this makes it possible to reinject data from an application service or one of higher level than the unified application programming interface API 94 on this interface, for example, from a Complex Event Processing CEP engine. Such a CEP engine can be both a consumer and producer of data on the application programming interface API 94. In this example, the production of data results from the creation of a new event by the CEP engine (e.g.: by correlation of other events), these data then being consumed by applications via the "publish/subscribe" publication/subscription interface 122;

to subscribe to data produced on "eThings" elements, by defining an event filter termed "EventFilter", making it possible to record an event "listener" on the service. When data corresponding to the filter are published, a recall function is used, customarily referred to as "callback". Advantageously, the "callback" recall function makes it possible to implement an event interface 124 relating to the "e Thing" element function termed "EThingFunctionEvent" interface 124 which has just a single method:

void handleEThingFunctionEvent (EThingFunctionEvent<D> event)

An exemplary use of "listener", allowing a data consuming application of an item of equipment 1, 89, 91 to record a "callback" (or to invoke a method when its data become available) is given hereinbelow:
is given hereinbelow:

```
EventFilter eventFilter= EventFilter.eventFilter(context);
MyHandler<Data> hdl = new MyHandler( . . . );
   eventFilter.registerEThingFunctionEventHandler(hdl, Data.class, getName( ),
getVersion( ), getUid( ), null);
```

Figure 30:
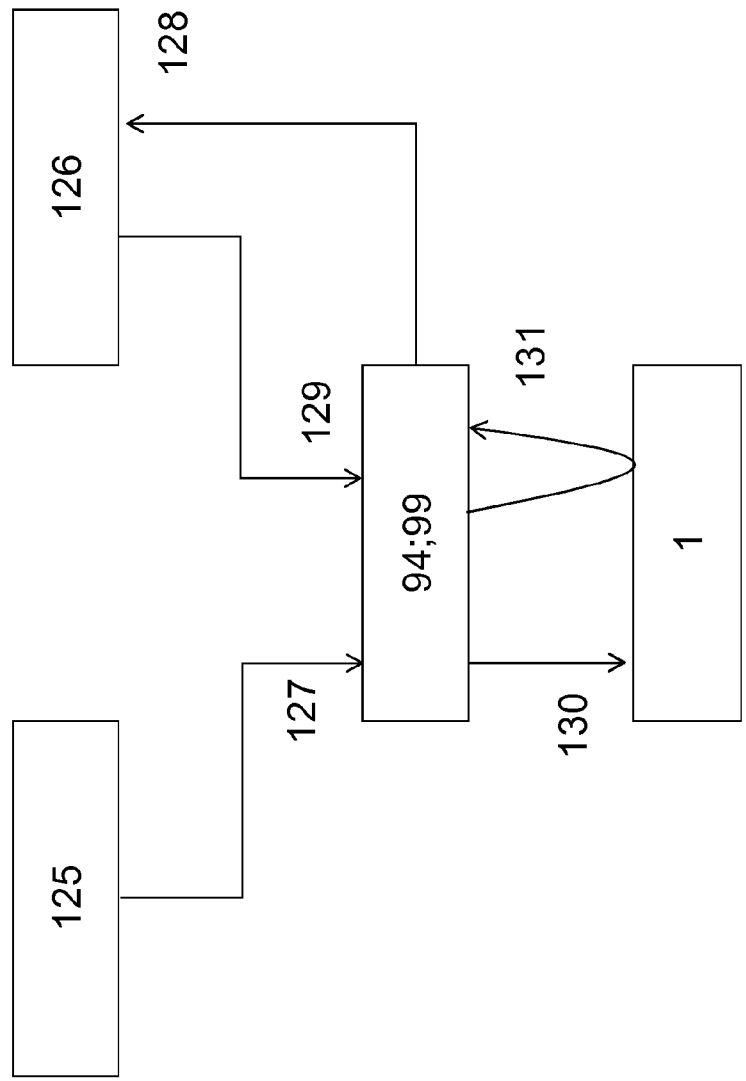
FIG. 30 illustrates an operation of the unified-access structure with an item of equipment operating according to a synchronous mode according to one embodiment.

Advantageously, the set of user application services rely on the unified application programming interface API 94, allowing an abstraction of the items of equipment 1, 89, 91 and underlying communication protocols. Thus, the replacement of an item of equipment 1, 89, 91, with a new item of equipment resting on a different communication protocol, but offering the same services, that is to say the same functions, does not then have any impact on the code of the user service bound to the unified application programming interface API 94. Furthermore, the unified application programming interface API 94 offers a means of abstracting the mode of access to the items of equipment 1, 89, 91 be it synchronous (pulled data mode "pull") for data reading or writing, or be it asynchronous or bound to an event (pushed data mode "push") for reading data arising from the items of equipment 1, 89, 91, via the publication/subscription "publish/subscribe" and "request" request interfaces 122, 123. Advantageously, any mode not implemented natively by an item of equipment 1, 89, 91 is then simulated by the unified-access structure 99 ("framework"). FIG. 30 illustrates by way of example, an item of equipment 1 operating, according to a synchronous mode (pulled mode "pull"), interfaced with the unified-access structure 99 ("framework") including the unified application programming interface API 94, this structure being interfaced with a first user service 125 based on synchronous mode, and a second user service 126 based on an asynchronous mode. The first user service 125 therefore uses the "request" request interface 123, while the second user service 126 uses the "publish/subscribe" publication/subscription interface 122 of the unified application programming interface API 94 of the unified-access structure 99 ("framework"). In this example, the modes of requests emanating from the first user service 125 are represented by the arrow 127, while the publication/subscription "publish/subscribe" modes are represented respectively by the arrows 128, 129.

The write and read "request" synchronous mode is implemented by simple delegation, that is to say by a simple method call, on the native interface of the item of equipment 1: use is then made of messages of write-"SET" type propagated (arrow 130) on the item of equipment 1 and read-"GET" type returning the last value/data item read on the item of equipment 1.

The event-based mode being asynchronous, the latter mode is then simulated by the unified-access structure 99 ("framework") by periodically retrieving (arrow 131), via the "request" request interface 123, the data on the item of equipment and by storing the last data item read. The latter data item is then dispatched to the "publish/subscribe" publication/subscription interface 122.

Figure 31:
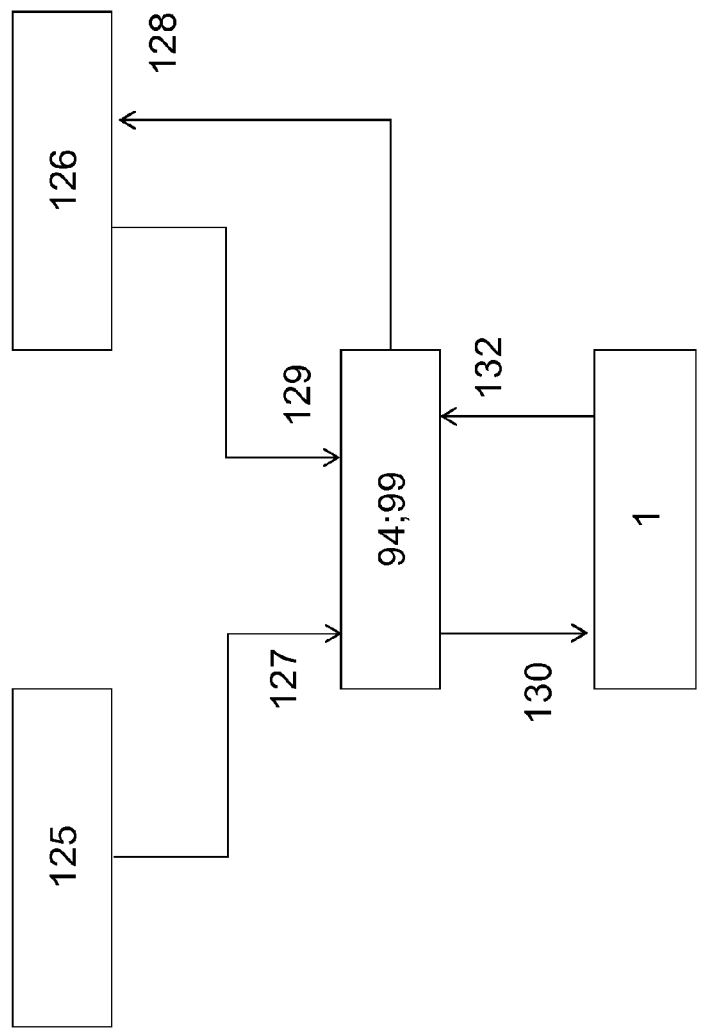
FIG. 31 illustrates an operation of the unified-access structure with an item of equipment operating according to an asynchronous mode according to one embodiment.

Advantageously, the collection period is configurable via the "eThingFunction" elements function abstract interface 113. FIG. 31 illustrates an item of equipment 1 operating, according to an event-based mode ("push" mode), interfaced with the unified-access structure 99 ("framework") including the unified application programming interface API 94, this structure being interfaced with a first user service 125 based on synchronous mode, and a second user service 126 based on an asynchronous mode. The first user service 125 therefore uses the "request" request interface 123, while the second user service 126 uses the "publish/subscribe" publication/subscription interface 122 of the unified application programming interface API 94 of the unified-access structure 99 ("framework"). In this example, the modes of requests emanating from the first user service 125 are represented by the arrow 127, while the "publish/subscribe" publication/subscription modes are represented respectively by the arrows 128, 129. In contradistinction to the previous example, the item of equipment 1 pushes its data to the "publish/subscribe" publication/subscription interface 122. Thus, the arrow 128 pertains to the propagation of the data that the item of equipment 1 pushes (arrow 132) at each new event. The item of equipment 1 now being based on asynchronous mode, the unified-access structure 99 ("framework") now simulates the synchronous mode by storing the last data item pushed by the item of equipment 1 via the "publish/subscribe" publication/subscription interface 122. This data item is then dispatched to the "request" request interface 123. Thereafter, as previously, the write- and read-"request" synchronous mode is implemented by simple delegation on the native interface of the item of equipment: use is then made of messages of write-"SET" type propagated (arrow 130) on the item of equipment 1 and read-"GET" type returning the last value read on the item of equipment 1.

The invention claimed is:

1. A communication device for data management of a plurality of items of user equipment including sensors and actuators installed in a predefined environment, the device comprising:
   a first communication interface for retrieving at least one measurement measured by at least one sensor of the plurality of items of user equipment;
   a second communication interface for communicating at least one command to at least one actuator of the plurality of items of user equipment;
   a software platform configured to isolate a resource for the retrieval of a first item of data and for the communication of the at least one command in leaktight containers, and
   wherein the plurality of items of user equipment are configured to implement an authentication, authorization, and accounting protocol.

2. The communication device of claim 1, further including a transmitter configured to transmit at least one item of data to a central data platform.

3. The communication device of claim 1, further including a processor for possessing a private address not addressable from a central data platform.

4. The communication device of claim 2, wherein the item of data is a parameter associated with an item of equipment of the plurality of items of user equipment.

5. The communication device of claim 1, further including an application programming interface.

6. The communication device of claim 1, further including a receiver configured to receive the at least one command.

7. A local area network comprising the communication device of claim 1.

8. The local area network of claim 7, comprising an integrated access device interfaced with the communication device.

9. The communication device of claim 2, further including a processor for possessing a private address not addressable from the central data platform.

10. The communication device of claim 2, further including an application programming interface.

11. The communication device of claim 3, further including an application programming interface.

12. The communication device of claim 4, further including an application programming interface.

13. The communication device of claim 2, further including a receiver configured to receive the at least one command.

14. The communication device of claim 3, further including a receiver configured to receive the command.

15. The communication device of claim 4, further including a receiver configured to receive the command.

16. The communication device of claim 5, further including a receiver configured to receive the command.

17. A local area network comprising the communication device of claim 2.

18. A local area network comprising the communication device of claim 3.

19. A local area network comprising the communication device of claim 4.

* * * * *